United States Patent
Kim

(10) Patent No.: US 10,812,190 B1
(45) Date of Patent: Oct. 20, 2020

(54) ACTIVE OPTICAL CABLE (AOC) DEVICE AND OPERATION CONTROL METHOD THEREOF

(71) Applicant: QUALITAS SEMICONDUCTOR CO., LTD., Seoul (KR)

(72) Inventor: Duho Kim, Seoul (KR)

(73) Assignee: QUALITAS SEMICONDUCTOR CO., LTD., Seoul (KR)

(*) Notice: Subject to any disclaimer, the term of this patent is extended or adjusted under 35 U.S.C. 154(b) by 0 days.

(21) Appl. No.: 16/577,769

(22) Filed: Sep. 20, 2019

(30) Foreign Application Priority Data

Sep. 5, 2019 (KR) .................. 10-2019-0109822

(51) Int. Cl.
| | |
|---|---|
| H04B 10/25 | (2013.01) |
| H04L 25/03 | (2006.01) |
| H04B 10/50 | (2013.01) |
| H04B 10/69 | (2013.01) |
| H01B 7/42 | (2006.01) |
| G02B 6/44 | (2006.01) |
| H04B 10/079 | (2013.01) |
| G02B 6/42 | (2006.01) |

(52) U.S. Cl.
CPC ....... *H04B 10/25891* (2020.05); *H04B 10/50* (2013.01); *H04B 10/6971* (2013.01); *H04L 25/03885* (2013.01); *G02B 6/42* (2013.01); *G02B 6/44* (2013.01); *H01B 7/42* (2013.01); *H04B 10/079* (2013.01)

(58) Field of Classification Search
CPC .......... H04L 25/03885; H04B 10/2504; H04B 10/50; H04B 10/6971; H04B 10/079; G02B 6/42; G02B 6/44; H01B 7/42

USPC ........................................................ 398/142
See application file for complete search history.

(56) References Cited

U.S. PATENT DOCUMENTS

| | | | |
|---|---|---|---|
| 7,548,675 B2* | 6/2009 | Tatum .................. | G02B 6/4246 385/100 |
| 7,756,197 B1* | 7/2010 | Ferguson .................. | H04L 1/24 375/224 |
| 8,233,805 B2* | 7/2012 | Tatum .................. | G02B 6/4201 398/141 |
| 9,877,090 B2* | 1/2018 | Cohard ............ | H04B 10/25891 |
| 10,547,408 B2* | 1/2020 | He ...................... | H04B 10/5053 |

(Continued)

*Primary Examiner* — Abbas H Alagheband
(74) *Attorney, Agent, or Firm* — Novick, Kim & Lee, PLLC; Sang Ho Lee

(57) ABSTRACT

Provided is an Active Optical Cable (AOC) device for short-range optical communication. The AOC device includes an electrical wire between a transmitter and a receiver for the feedback of a monitoring signal from the receiver. The receiver further includes a monitoring circuit to control the compensation of a high frequency component of an equalizing filter, acquire the result of receiving signal size determination and a high frequency component compensation from the equalizing filter, and perform the feedback of the acquired monitoring signal to the transmitter through the electrical wire. The transmitter further includes a transmitter control circuit to receive the feedback monitoring signal from the receiver through the electrical wire and control a high frequency component control code of the high frequency component control circuit and an optical signal output size control code of the optical device driving circuit based on the received monitoring signal.

10 Claims, 17 Drawing Sheets

(56) References Cited

U.S. PATENT DOCUMENTS

| | | | |
|---|---|---|---|
| 2008/0107423 A1* | 5/2008 | Lee | H04B 10/40 398/136 |
| 2009/0214221 A1* | 8/2009 | Li | H04B 10/40 398/136 |
| 2012/0076508 A1* | 3/2012 | Mezer | H04B 10/697 398/210 |
| 2014/0250328 A1* | 9/2014 | Schnizler | G01R 31/3177 714/31 |
| 2015/0295642 A1* | 10/2015 | Nikaido | H04B 10/40 398/28 |
| 2016/0109667 A1* | 4/2016 | Cornelius | H04B 10/07955 356/73.1 |
| 2016/0301472 A1* | 10/2016 | Parekh | H04B 10/25 |
| 2016/0308606 A1* | 10/2016 | Skirmont | H04B 10/27 |
| 2016/0370547 A1* | 12/2016 | Logan, Jr. | G02B 6/4283 |
| 2017/0126318 A1* | 5/2017 | Chang | G02B 6/4214 |
| 2017/0163339 A1* | 6/2017 | Cornelius | H04B 10/07955 |
| 2017/0272153 A1* | 9/2017 | Storey | G02B 6/29361 |
| 2018/0017742 A1* | 1/2018 | Louderback | G02B 6/4415 |
| 2018/0041272 A1* | 2/2018 | Cornelius | G01M 11/335 |

\* cited by examiner

ACTIVE OPTICAL CABLE (AOC) DEVICE AND OPERATION CONTROL METHOD THEREOF

TECHNICAL FIELD

The present invention relates to an Active Optical Cable (AOC) device and its operation control method. More particularly, the present invention relates to an AOC device implemented as an adaptive system dedicated to AOC (Active Optical Cable) wherein power consumption and cost can be reduced, and a method for controlling the operation thereof.

BACKGROUND

Optical communication has been widely used in building a broadband communication network using wide bandwidth and low loss characteristics as well as high transmission rate and long distance transmission characteristics of optical fiber cables. The optical communication is mainly used for long distance communication, and electric communication using an electric cable is used for short-range communication.

However, in recent years, the development of ICT technology increases the transmission rate of data communication, and such increase in transmission rate leads to a high frequency attenuation of an electric wire, resulting in a shorter communication distance.

In order to overcome a limitation in transmission distance of a telecommunication cable as mentioned above, an AOC (Active Optical Cable; Short-range optical communication cable device) is used for short-range optical communication, as a product wherein optical devices and optical communication ICs are mounted on both ends of optical fiber cables for transmitting optical signals in the form of modules. In addition, by using the same connector as in electric cables, electric cables can be directly replaced.

Short-range optical communication is used for transmission distances of 1 to 100 m in intra-building, inter-rack and in-equipment communications, and requires low cost and low power consumption when compared to long distance optical communication. For long distance optical communication, relatively expensive SMF (Single-Mode Fiber) is used in fiber optic cables. For short-range optical communication, relatively low cost MMF (Multi-Mode Fiber) is used. As a light source, a DFB laser is used for long distance optical communication, and a VCSEL (vertical-cavity surface-emitting laser) is used for short distance optical communication. The VCSEL has low cost and low power consumption when compared to the DFB Laser.

As the main application of AOC for short-range optical communication, it is used as a communication link cable in a data center. With the advent of cloud computing, big data, etc., data centers are rapidly spreading, and such data centers are made of thousands ~tens of thousands of server computers, requiring much more communication connections than the number of servers to share data between servers.

Cables for short-range optical communication cables are used in large quantities relative to cables for long distance optical communication. Such short-range communication cables are used in large quantities in large computer facilities such as data centers.

The data center is divided into a number of server rooms, and a large number of racks are arranged in each of server rooms. Each of racks has communication equipment, a server and a storage which are stacked to each other. Within each rack in the data center, these server, storage and communication equipment are connected using DACs (direct-attach cables), a communication cable for the data center that is connected by electrical conductors (0-3 m); racks are connected by AOC cables (3 to 30 m), and server rooms are connected by transceiver cables (30 to 100 m).

However, DACs and AOCs used as connection cables in data centers have similar shape, and transceiver cables are a structure (long-distance/short-range product) that has been inherited from the existing long-distance communication. Since AOCs are addressed as being the same as DACs, there is no specification for its internal structure. The transceiver cables using connected optical fibers have a standardized optical performance.

Since power consumption in data centers is continually increasing, power consumption should be lowered to reduce operating costs. That is, the demand for technology to reduce power consumption in terms of hardware and software is highlighted. Hardware used in data centers typically has five- to six-year service lives, but operating costs continue to increase, making it most efficient to replace every three years to account for the superior performance and power efficiency of the new hardware.

Today's data center AOC products consume a certain amount of power regardless of their transmission distance. Since most AOC manufacturers provide AOC products that support up to 100 m instead of 30 m, the power consumption of such AOCs is the same as that of MMF-used transceiver products. That is, 1 m AOCs, 100 m AOCs, and transceiver products have the same power consumption of 3.5 W. This is because optical communication ICs for transceivers are also used in AOCs and AOCs are manufactured only by fixing optical fiber cables to transceivers.

The reason why the power consumption is the same regardless of transmission distances is that such products are designed in consideration of margins due to tolerances in manufacturing processes. All parts used in a system have tolerances, a product must be designed for the worst case parts.

The only parameter that can be selected by a manufacturer of AOC modules is an optical transmitter output current. As a result, the light output should be set to a certain degree to allow normal operation when only the worst parts are used. For example, assuming that the optical transmitter output current requires 1.53 mA for the best component, 3.063 mA for the middle component, and 7.144 mA for the worst component, you should choose 7.144 mA sufficient to satisfy even when using the worst component in consideration of a yield. It should be considered more than double the output current consumption for stable operation.

In addition, a current for driving VCSEL, which is a light source for a normally operating optical transmitter, should be designed with excessive performance. As the VCSEL device is dependent on temperature, a current-to-light conversion efficiency of VCSEL device decreases as temperature increases. The current required to make the same magnitude optical signal is increased with increasing temperature. Therefore, the VCSEL driving current should be largely selected to meet the limiting operation maximum temperature, so it is designed with excessive performance.

To maintain the driving current of VCSEL in the optimal state rather than an excessive state, a monitoring is needed to compensate high frequency components. Fiber optics have a very wide bandwidth, but there are bandwidth limitations for optical devices and integrated circuits. A wider bandwidth optical device has a higher cost. If an integrated circuit can compensate a limitation in bandwidth of an optical device, it will be possible to use a cheap optical device.

A method to enable an integrated circuit to compensate bandwidth is to enhance a high frequency component in the driving current of VCSEL by applying a Pre-emphasis method for an optical transmitter. For an optical receiver, an attenuated high frequency signal must be properly compensated by compensating a high frequency component in a restored current signal through an Equalizer circuit. If it is insufficient or excessive, a signal distortion is generated.

Therefore, a receiver unit should transmit the result of monitoring light output and high frequency component attenuation to a transmitter unit, and the transmitter unit compensates the attenuated high frequency component and sends out only the necessary optical signal output to reduce power consumption. As a result, cheap optical devices can be used.

As conventional analog monitoring methods, a method of sensing a current output from a photodetector, a method of converting a current output from a photodetector into a voltage signal followed by measuring its size, and the like have been described. However, these methods have a problem of being difficult to monitor high frequency signals. As conventional digital monitoring methods, there are a method of converting an optical signal into an electrical signal followed by restoring data, and a method of digitally converting an optical signal followed by observing signal quality. The former uses a clock data recovery circuit, and the latter uses an analog-digital converter and large digital logic for cue-factor determination. Therefore, both of methods have a disadvantage of consuming a lot of power consumption and having a large circuit area.

A conventional feedback circuit adopts a method of transmitting a monitoring result in between data to be sent in bi-directional communication between A side and B side. Therefore, this method has disadvantages of a complicated protocol, an overall increased circuit area, and a reduced data transmission efficiency. Further, this method cannot be used for AOC which is one-directional transmission.

Another conventional feedback method monitors an output from an optical transmitter, and applies it to the optical transmitter. This feedback method is mainly used in long distance communication and requires optical devices and optical parts to fabricate a dedicated monitoring circuit. Further, it does not observe signals from a receiver unit, and cannot obtain a complete monitoring of transmitted signals, strictly speaking.

As further conventional feedback method, there is a method of adding a dedicated optical communication channel. However, it has a disadvantage that an optical fiber cable, an optical device and an optical part are added by one channel.

SUMMARY

Problems to be Solved

The present invention has been proposed to solve the above-mentioned problems. In an aspect, the present invention provides an AOC device wherein the feedback of a monitoring signal from a receiver to a transmitter is performed to control an optimized optical output current and a method for controlling the operation thereof. Thus, an AOC device with low cost and low power consumption can be implemented.

In another aspect, the present invention provides an integrated circuit for a receiver and a transmitter configured to use an electrical wire as a signal ling for the feedback of a monitoring signal. Thus, the feedback of the monitoring signal can be performed without adding an optical channel, resulting in low-cost implementation.

In still another aspect, the present invention provides a method comprising providing an adaptive equalizer for a receiver, monitoring the results of input signal size determination and high frequency component compensation from the adaptive equalizer and sending these results to a transmitter, thereby controlling optical communication with optimal transmission power in real-time.

Means to Solve the Problems

To this end, according to an embodiment of the present invention, an AOC device which performs optical communication through an optical fiber cable connected between a transmitter and a receiver comprises an additional electrical wire between the transmitter and the receiver for the feedback of a monitoring signal from the receiver to transmitter,
    wherein the receiver comprises an optical receiver integrated circuit within an equalizing filter to compensate a high frequency component of a receiving signal and make equalization, and further comprises a monitoring means configured to control the high frequency component compensation in the equalizing filter, acquire the result of receiving signal size determination and high frequency component compensation in the equalizing filter as a monitoring signal, and perform the feedback of the acquired monitoring signal to the transmitter through the electrical wire; and
    wherein the transmitter comprises an optical transmitter integrated circuit including a high frequency component control circuit to control the high frequency component of the input signal and an optical device driving circuit to drive an optical device, and further comprises a transmitter control means configured to receive the feedback monitoring signal from the receiver through the electrical wire and control a high frequency component control code of the high frequency component control circuit and an optical signal output size control code of the optical device driving circuit based on the received monitoring signal.

In another embodiment of the present invention, a one-directional AOC device and a bi-directional AOC device may comprise MCUs which respectively comprise the functions of the transmitter control means and the monitoring means.

In another embodiment of the present invention, a one-directional AOC device and a bi-directional AOC device may comprise an optical signal receiving and high frequency component monitoring circuit in the optical receiver integrated circuit; and may comprise an optical signal output and high frequency component control circuit in the optical transmitter integrated circuit.

In further embodiment of the present invention, a one-directional AOC device comprises:
    a first connector unit which comprises an optical transmitter integrated circuit to control a high frequency component of an input electrical signal and generate an optical device driving signal in response to the electrical signal, and an optical device for optical output to generate an optical signal by the optical device driving signal and transmit it to an optical fiber cable;

a second connector unit which comprises an optical device for optical reception to receive the optical signal transmitted through the optical fiber cable, and an optical receiver integrated circuit to convert an output current from the optical device for optical reception to a voltage and compensate a high frequency component of the receiving signal for outputting an electrical signal; and one or more optical fiber cables which are connected between the first connector and the second connector to transmit the optical signal, and further comprises:

a transmitter MCU included in the first connector, which comprises the function of the optical signal output control and the high frequency component control of the optical transmitter integrated circuit;

a receiver MCU included in the second connector, which comprises the function of the optical signal receiving control and the high frequency component control of the optical receiver integrated circuit; and an electrical wire for the feedback of a monitoring signal, which is connected between the receiver MCU and the transmitter MCU, wherein the receiver MCU is configured to monitor the result of receiving signal size determination and high frequency component compensation from the optical receiver integrated circuit and perform the feedback of the monitoring signal to the transmitter MCU through the electrical wire, and wherein the transmitter MCU is configured to control an optical signal output and a high frequency component compensation signal from the optical transmitter integrated circuit based on the feedback monitoring signal.

According to the present invention, the optical transmitter integrated circuit comprises:

an electrical signal input circuit in which an electrical signal is input;

a high frequency component control circuit to control a high frequency component of a current signal for driving an optical device for reinforcing it;

an optical device driving circuit to drive the optical device for optical output (VCSEL) based on the electrical signal in which the high frequency component is controlled; and a transmitter internal memory and an interface circuit which performs the interface of the feedback monitoring signal from the transmitter MCU to the high frequency component control code of the high frequency component control circuit and the optical signal output size control code of the optical device driving circuit for optical output and controls an output current of the transmitter.

According to the present invention, the optical receiver integrated circuit comprises:

a TIA (Trans-Impedance Amplifier) to convert a current signal undergoing photoelectric conversion through the optical device for optical reception (PD) to a voltage signal;

an adaptive equalizer which filters a receiving signal by an equalizing filter to compensate a high frequency component of the receiving signal and continuously monitors a size and a high frequency component of the input signal to allow the optimal compensation of the high frequency component in the equalizing filter;

an electrical signal driving circuit to output the receiving signal with the high frequency component compensated in the adaptive equalizer in the form of an electrical signal; and a receiver internal memory and an interface circuit which transfers the result of input signal size determination and high frequency component compensation from the adaptive equalizer to the receiver MCU.

According to the present invention, the adaptive equalizer comprises:

a first equalizing filter configured to output a compensated high frequency component of an receiving signal by an equalizer control code;

a second equalizing filter configured to receive the receiving signal in parallel with the first equalizing filter and output the compensated high frequency component as a monitoring signal by an equalizer monitoring code;

a size comparator configured to compare a size of the monitoring signal from the second equalizing filter with a reference voltage set by a reference voltage code; and a digital control unit configured to convert an output sampled from the size comparator by varying the equalizer monitoring code provided to the second equalizing filter and the reference signal in the size comparator to digital data and find the optimal equalizer control code based on the digital data, thereby controlling the equalizer control code of the first equalizing filter.

In further embodiment of the present invention, a bi-directional AOC device comprises:

first and second connector units configured to comprise an optical transmitter integrated circuit to control a high frequency component of an input electrical signal for reinforcing it and drive an optical device in response to the electrical signal; an optical device for optical output to convert the electrical signal to an optical signal under the control of the optical transmitter integrated circuit and transmit it to an optical fiber cable; an optical device for optical reception to receive the optical signal received through the optical fiber cable; an optical receiver integrated circuit to convert a current signal from the optical device for optical reception to a voltage signal and output a compensated high frequency component of the receiving signal converted to the voltage signal as an electrical signal; and a MCU to control an integrated circuit which includes the function of the optical signal output control and the high frequency component control of the optical transmitter integrated circuit and the optical receiver integrated circuit;

a plurality of optical fiber cables to transmit and receive the optical signal, at both ends of which the first connector and the second connector are respectively connected; and first and second electrical wires for the feedback of the monitoring signal, which are arranged with the optical fiber cables and connected between the MCUs to control the integrated circuits of the first and second connectors, wherein the MCU to control the integrated circuit performs the feedback of the result of receiving signal size determination and high frequency component compensation from the optical receiver integrated circuit to a MCU for controlling an integrated circuit of a communication counterpart through the first and second electrical wires for the feedback of the monitoring signal, and controls the optical signal output and the high frequency component compensation of the optical transmitter integrated circuit based on the feedback monitoring signal.

In further embodiment of the present invention, a one-directional AOC device comprises:
- a first connector unit which comprises an optical transmitter integrated circuit to controls a high frequency component of an input electrical signal and generate an optical device driving signal in response to the electrical signal, and an optical device for optical output to generate an optical signal by the optical device driving signal and transmit it to an optical fiber cable;
- a second connector unit which comprises an optical device for optical reception to receive the optical signal transmitted through the optical fiber cable, and an optical receiver integrated circuit to convert an output current from the optical device for optical reception to a voltage and compensate a high frequency component of the receiving signal for outputting an electrical signal; and
- one or more optical fiber cables which are connected between the first connector and the second connector to transmit the optical signal, and further comprises:
- an electrical wire for the feedback of a monitoring signal, which is connected between the optical receiver integrated circuit and the optical transmitter integrated circuit to transmit the monitoring signal from the receiver to the transmitter,
- wherein the optical receiver integrated circuit further comprises an optical signal output and high frequency component monitoring circuit to monitor the result of receiving signal size determination and high frequency component compensation and perform the feedback of a monitoring signal to the optical transmitter integrated circuit through the electrical wire, and
- wherein the optical transmitter integrated circuit further comprises an optical signal output and high frequency component control circuit to control a high frequency component control code and an optical signal output size control code of the optical transmitter integrated circuit based on the feedback monitoring signal from the optical signal output and high frequency component monitoring circuit.

In further embodiment of the present invention, a bi-directional AOC device comprises:
- first and second connector units configured to comprise an optical transmitter integrated circuit to control a high optical frequency component of an input electrical signal for reinforcing it and drive an optical device in response to the electrical signal; an optical device for optical output to convert the electrical signal to an optical signal under the control of the optical transmitter integrated circuit and transmit it to an optical fiber cable; an optical device for optical reception to receive the optical signal received through the optical fiber cable; and an optical receiver integrated circuit to convert a current signal from the optical device for optical reception to a voltage signal and output a compensated high frequency component of the receiving signal converted to the voltage signal as an electrical signal;
- a plurality of optical fiber cables to transmit and receive the optical signal, at both ends of which the first connector and the second connector are respectively connected; and
- first and second electrical wires for the feedback of the monitoring signal, which are connected between the optical receiver integrated circuit and the optical transmitter integrated circuit of the first and second connector units to transmit the monitoring signal from the receiver to the transmitter,
- wherein the optical receiver integrated circuit further comprises an optical signal output and high frequency component monitoring circuit to monitor the result of receiving signal size determination and high frequency component compensation and perform the feedback of a monitoring signal to the optical transmitter integrated circuit of a communication counterpart through the first or second electrical wire, and
- wherein the optical transmitter integrated circuit further comprises an optical signal output and high frequency component control circuit to control a high frequency component control code and an optical signal output size control code of the optical transmitter integrated circuit based on the feedback monitoring signal from the optical signal output and high frequency component monitoring circuit of the communication counterpart.

Furthermore, the present invention provides a method for controlling the operation of an AOC device.

According to an embodiment of present invention, a method for controlling the operation of an AOC device comprises monitoring a signal transmitted from a transmitter in a receiver and performing the feedback of the monitoring signal, wherein the receiver performs:
- a input signal size determination step of comparing an input signal range with a reference signal range to adjust the input signal size such that the input signal is within the reference signal range;
- an equalizing filter monitoring step of monitoring an equalization characteristic of a receiver equalizing filter to find an optimum high frequency band gain after the input signal is adjusted within the reference signal range;
- a feedback step of collecting the result of input signal size determination from the input signal determination step and the result of high frequency component compensation from the equalizing filter monitoring step and performing the feedback of these result to the transmitter; and
- a standby step of terminating the equalizing filter for a predetermined time if the input signal is smaller than the reference signal range and then it is determined that there is no input signal in the input signal size determination step, terminating the equalizer monitoring for a predetermined time if the optimum high frequency band gain is found and applied to the equalizing filter in the equalizing filter monitoring step, and returning to the input signal size determining step by operating the equalizer monitoring and the equalizing filter after the predetermined time has elapsed, and wherein the transmitter performs:
- a transmitter adjustment step of controlling a high frequency component and an optical signal output size of the transmitter based on the feedback monitoring signal from the receiver.

Effect of the Invention

According to the present invention, it is possible to perform the feedback of a monitoring signal from a receiver to a transmitter using a cheap electrical wire and control the optimum high frequency component control code and optical signal output size in the transmitter. Thus, an optical device for optical output and a driving circuit therefor can be implemented at low cost and power consumption can be reduced. In addition, the overall manufacturing cost of a short-range AOC device can be reduced, and the power consumption can be reduced in large facilities such as data centers that require numerous short-range AOC devices.

DETAILED DESCRIPTION OF THE INVENTION

Figure 1:
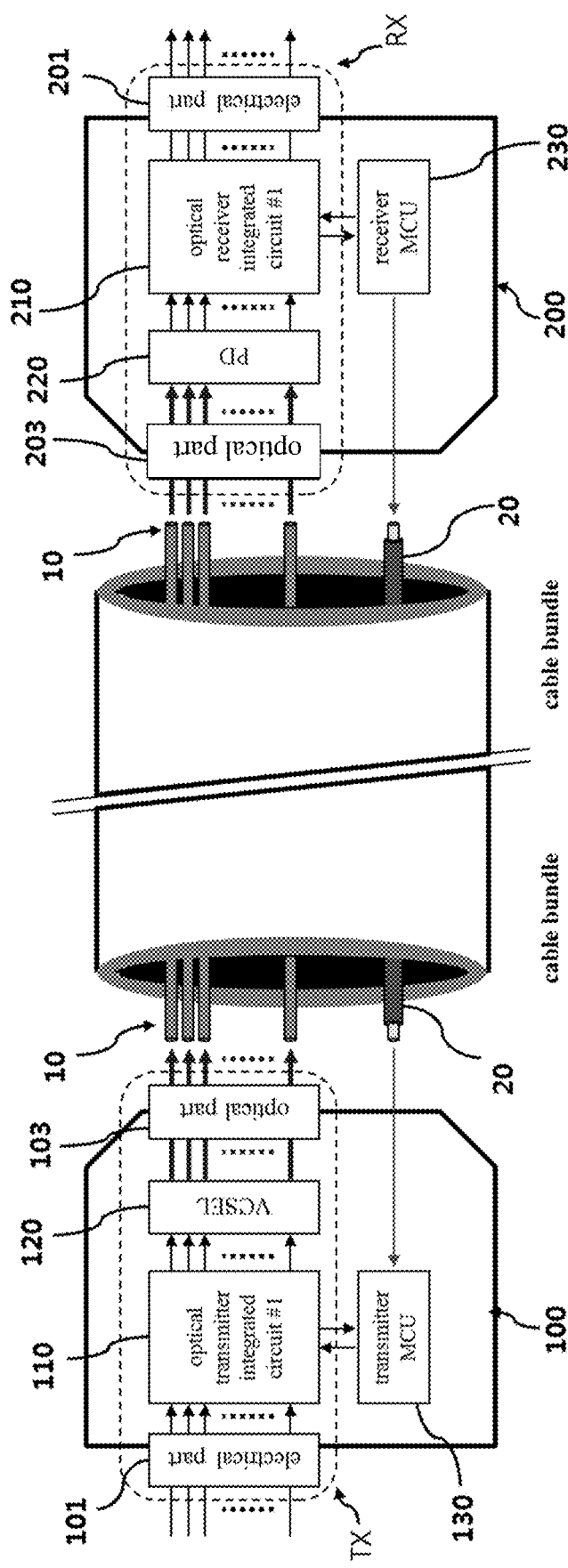
FIG. 1 is a schematic diagram showing a one-directional AOC device according to an embodiment of the present invention.

As various variations and embodiments can be made for the present invention, particular embodiments will be further described in the drawings and the detailed description.

However, such embodiments are not intended to limit the present invention, it should be understood that the present invention encompasses all modifications, equivalents, and substitutes fall within the spirit and scope of the present invention.

The terminology used herein is only for describing particular embodiments and is not intended to limit the present invention. Singular expressions include plural expressions unless the context clearly indicates otherwise. In this application, the terms "comprise" or "have" are intended to indicate that there is a feature, number, step, operation, component, part, or any combination thereof described in the specification, and one or more other features, and it is to be understood that the present invention does not exclude the possibility of the presence or the addition of one or more features, numbers, steps, operations, components, components, or any combination thereof.

Unless defined otherwise, all terms used herein, including technical or scientific terms, have the same meaning as commonly understood by one of ordinary skill in the art. Terms such as those defined in the commonly used dictionaries should be construed as having meanings consistent with the meanings in the context of the related art, and shall not be construed in ideal or excessively formal meanings unless expressly defined in this application.

Hereinafter, preferable embodiments of the present invention will be described in detail with reference to the accompanying drawings. To facilitate the overall understanding of present invention, in the following description, the same reference numerals will be used for the same components in the drawings, and duplicate descriptions for the same components will be omitted. In addition, first and second connectors, an optical transmitter integrated circuit, and an optical receiver integrated circuit will be described with the same reference numerals, regardless of one-directional optical communication, bi-directional optical communication, or MCU.

FIG. 1 is a schematic diagram showing a one-directional AOC device according to an embodiment of the present invention.

As shown in FIG. 1, the one-directional AOC device comprises the optical fiber cable 10 comprised of a cable bundle and the first and second connectors 100 and 200 provided at both ends of the optical fiber cable 10.

In the one-directional AOC device, the first connector 100 may be referred to as the transmitter (TX) and the second connector 200 may be referred to as the receiver (RX).

The first connector 100 comprises the electrical part 101 to connect a computer device to an electrical signal, the optical transmitter integrated circuit 110, the VCSEL 120 as an optical device for optical output, the optical part 103 to connect an optical signal to the optical fiber cable 10, and the transmitter MCU 130 to control the optical signal integrated circuit 110.

The second connector 200 comprises the electrical part 201 to connect a computer device to an electrical signal, the optical receiver integrated circuit 210, the PD (Photo-Diode) 220 as an optical device for optical reception, the optical part 203 to collect an optical signal from the optical fiber cable 10, and the transmitter MCU 130 to control the optical signal integrated circuit 110.

The optical transmitter integrated circuit 110 is configured to control (reinforce) a high frequency component of an input electrical signal and drive the optical device 120 in response to the electrical signal. The optical device 120 uses VCSEL, which is used as a light source for short-range optical communication.

The optical receiver integrated circuit 210 converts a receiving signal from the optical device for optical reception 220 to a voltage signal and compensates a high frequency component of the receiving signal to output it as an electrical signal.

The optical fiber cable 10 has the number which is determined depending on the number of communication channels and is formed as a cable bundle. The electrical wire 20 for a feedback signal is packaged within the cable bundle with the optical fiber cable.

The transmitter MCU 130 of the first connector 100 controls a high frequency component control code for controlling a high frequency component of the optical transmitter integrated circuit 110 and an optical signal output size control code of an optical device driving circuit.

The receiver MCU 230 of the second connector 200 performs the feedback of receiving signal size determination and high frequency component compensation information from the optical receiver integrated circuit 210 to the transmitter MCU 130 through the electrical wire 20.

Consequently, according to the present invention, the feedback of a monitoring signal from the receiver MCU 230 to the transmitter MCU 130 is performed. Based on the feedback monitoring signal, the high frequency component control code and the optical signal output size control code are controlled.

Thus, by controlling the high frequency component reinforcement and the optical output signal size based on the monitoring signal from the receiver, the optimal output can be set. As such, the AOC device of the present invention sets an output current from VCSEL to the optimal current instead of the maximum value among possible currents in the prior art, and consequently the present AOC device can reduce power consumption. In addition, the present AOC device uses a feedback signal in real-time, thereby actively coping with changes in the communication environment.

Figure 2:
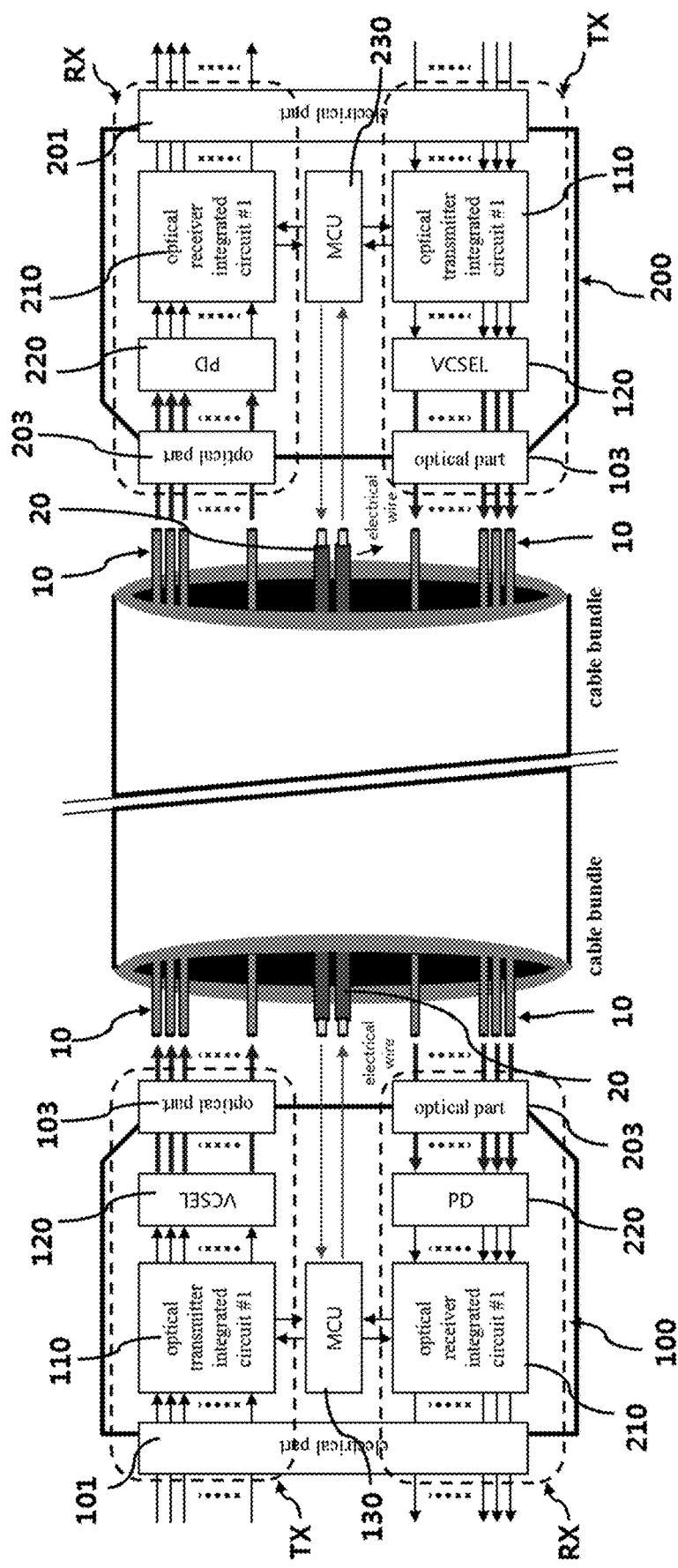
FIG. 2 is a schematic diagram showing a bi-directional AOC device according to an embodiment of the present invention.

FIG. 2 is a schematic diagram showing a bi-directional AOC device according to an embodiment of the present invention.

As shown in FIG. 2, the first connector 100 and the second connector 200 are respectively connected at both ends of a plurality of optical fiber cables 10. The first and second electrical wires 20 for monitoring signal feedback are connected between the first and second connectors 100 and 200. Each of the first and second connectors 100 and 200 comprises the transmitter (TX) and the receiver RX to allow bi-directional communication.

For convenience, the same component as the transmitter (TX) of the first and second connectors 100 and 200 is denoted by the same reference numeral in the drawings, and the same component as the receiver (RX) of the first and second connectors 100 and 200 is denoted by the same reference numeral in the drawings.

The first connector 100 comprises the MCU 130 to control an integrated circuit for the control of the transmitter (TX) and the receiver (RX), and the second connector 200 comprises the MCU 230 to control an integrated circuit for the control of the transmitter TX and the receiver RX.

The transmitter (TX) comprises the electrical part 101, the optical transmitter integrated circuit 110, the VCSEL 120 as an optical device for optical output, and the optical part 103. The receiver RX comprises the electrical part 201, the PD 220 as an optical device for optical reception, the optical receiver integrated circuit 210, and the electrical part 101.

In the bi-directional AOC device as shown in FIG. 2, the MCUs 130 and 230 to control the integrated circuit, which are provided in each of the first and second connectors 100 and 200, monitor a receiving signal from the optical receiver integrated circuit 210 of each receiver (RX) and performs the feedback to the MCU of a communication counterpart. The monitoring signal feedback is bi-directionally communicated through the first and second electrical wires 20. The MCUs 130 and 230 to control the integrated circuit which receive the monitoring signal feedback controls the optical transmitter integrated circuits 110 and 210 of each transmitter (TX) to control a high frequency component and an optical output current in the optimal state.

Figure 3:
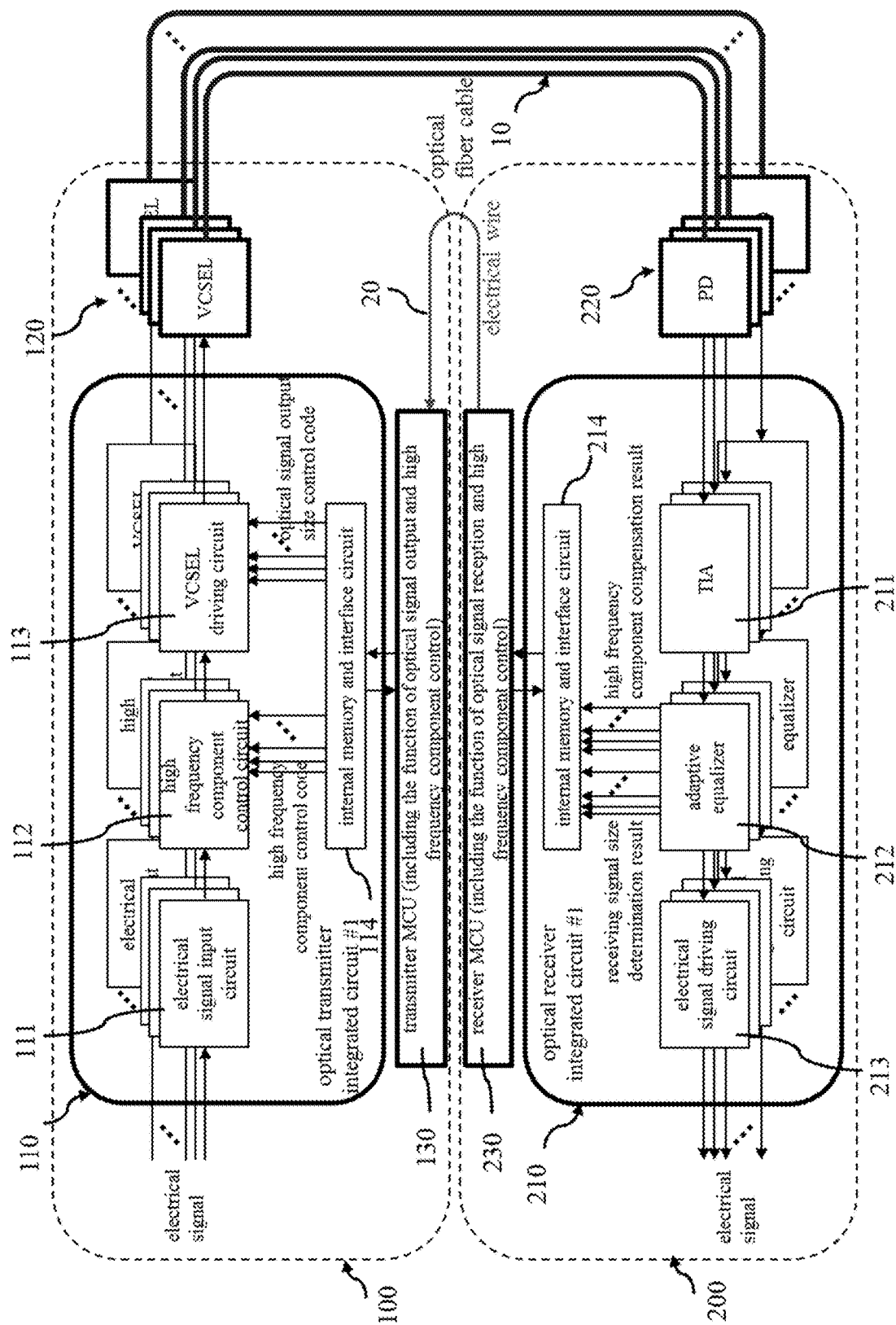
FIG. 3 is a detailed diagram for explaining the monitoring signal feedback in the AOC device comprising the MCUs as shown FIGS. 1 and 2.

FIG. 3 is a detailed diagram for explaining the monitoring signal feedback in the AOC device comprising the MCUs as shown FIGS. 1 and 2.

The optical transmitter integrated circuit #1 110 comprises the electrical signal input circuit 111, the high frequency component control circuit 112, the VCSEL driving circuit 113, the transmitter internal memory, and the interface circuit 114. The optical receiver integrated circuit 210 comprises the TIA 211, the adaptive equalizer 212, the electrical signal driving circuit 213, the receiver internal memory, and the interface circuit 214.

The transmitter MCU 130 controls the high frequency component control circuit 112 and the VCSEL driving circuit 113 of the transmitter through the transmitter internal memory and the interface circuit 114. The receiver MCU 230 receives the result of receiving signal size determination and high frequency component compensation as a monitoring signal from the adaptive equalizer 212 of the receiver through the receiver internal memory and the interface circuit 114.

The receiver MCU 230 performs the feedback of the monitoring signal to the transmitter MCU 130 through the electrical wire 20. The transmitter MCU 130 generates a high frequency component control code and an optical signal output size control code based on the monitoring signal feedback. The transmitter MCU 130 controls the high frequency component control code of the high frequency component control circuit 112 and the optical signal output size control code of the VCSEL driving circuit 113 through the transmitter internal memory and the interface circuit 114.

As a result, when data is transmitted from the first connector 100 to the second connector 200, the feedback of the monitoring signal from the second connector 200 to the first connector 100 is performed, and the transmitter MCU 130 of the first connector 100 controls the optical transmitter integrated circuit #1 110. It also controls the high frequency component control code of the high frequency component control circuit 112 and the optical signal output size control code of the VCSEL driving circuit 113. Such control is based on the feedback of the monitoring signal from the receiver. Thus, the result of monitoring a receiving signal can be applied in real-time to control a transmission output from the transmitter.

Meanwhile, the MCU may be integrated inside the optical transmitter integrated circuit #2 and the optical receiver integrated circuit #2 in the AOC device. This configuration will be described with reference to FIGS. 4, 5 and 6.

Figure 4:
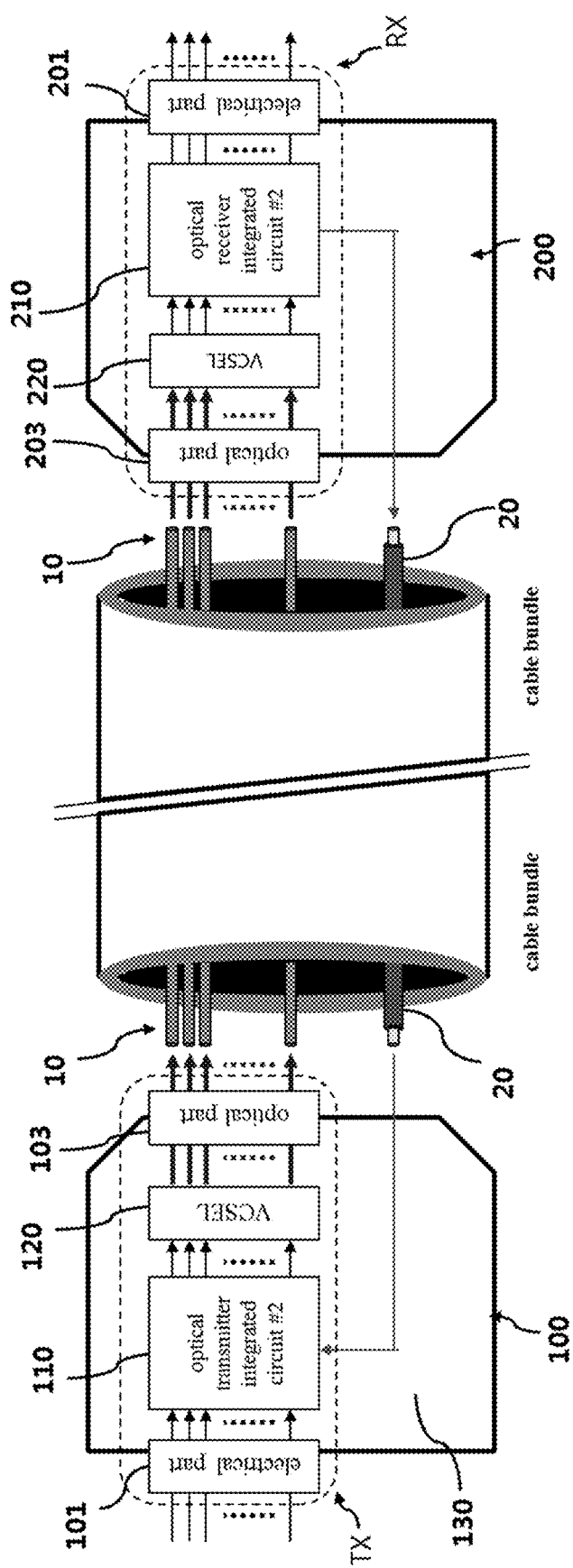
FIG. 4 is a schematic diagram showing a one-directional AOC device according to another embodiment of the present invention.
Figure 5:
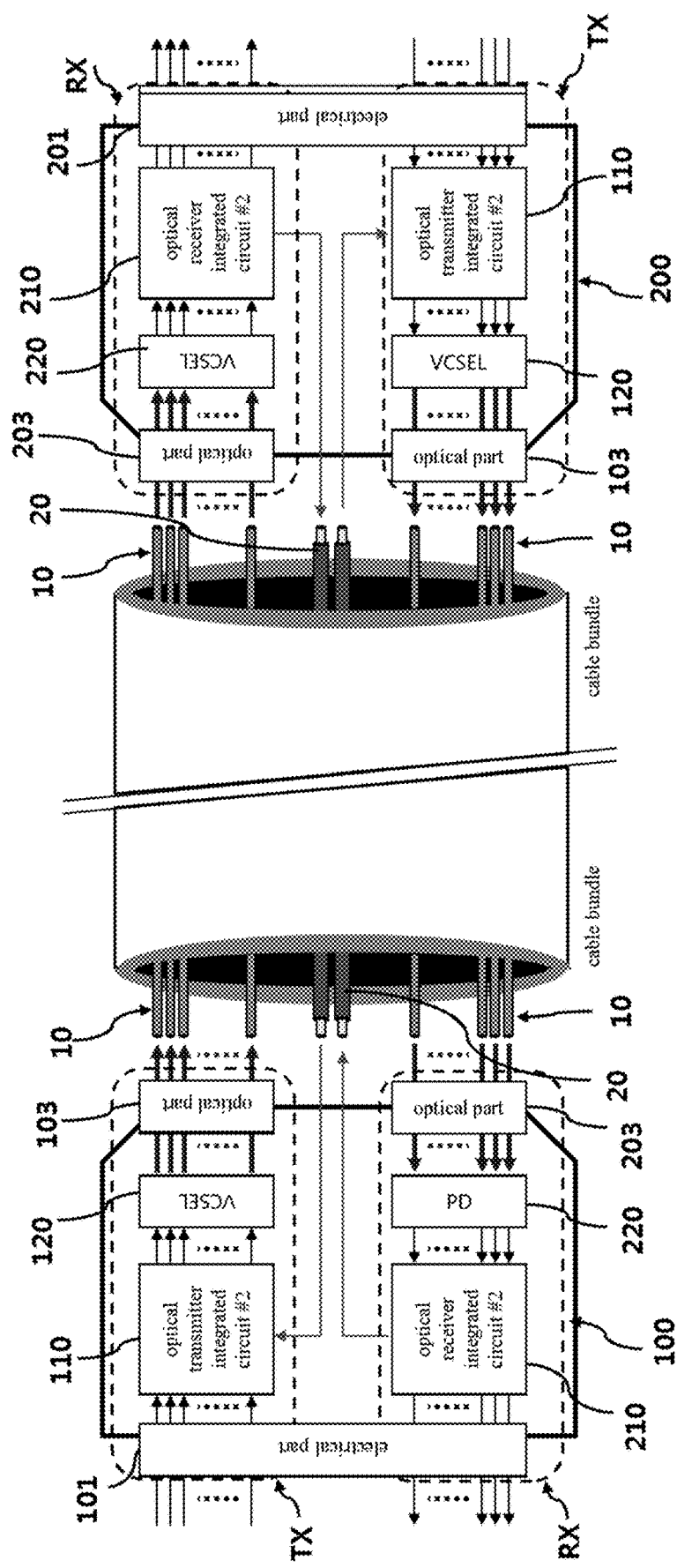
FIG. 5 is a schematic diagram showing a bi-directional AOC device according to another embodiment of the present invention.

FIG. 4 is a schematic diagram showing a one-directional AOC device according to another embodiment of the present invention, and FIG. 5 is a schematic diagram showing a bi-directional AOC device according to another embodiment of the present invention.

FIG. 4 shows a configuration excluding the transmitter MCU and the receiver MCU from the device of FIG. 1. The function of the MCU is included in each of the optical transmitter integrated circuit #2 110 and the optical receiver integrated circuit #2 210.

Similarly, FIG. 5 shows a configuration excluding the MCU to control the integrated circuit from the device of FIG. 2. The function of the MCU to control the integrated circuit is included in each of the optical transmitter integrated circuit #2 110 and the optical receiver integrated circuit #2 210.

Figure 6:
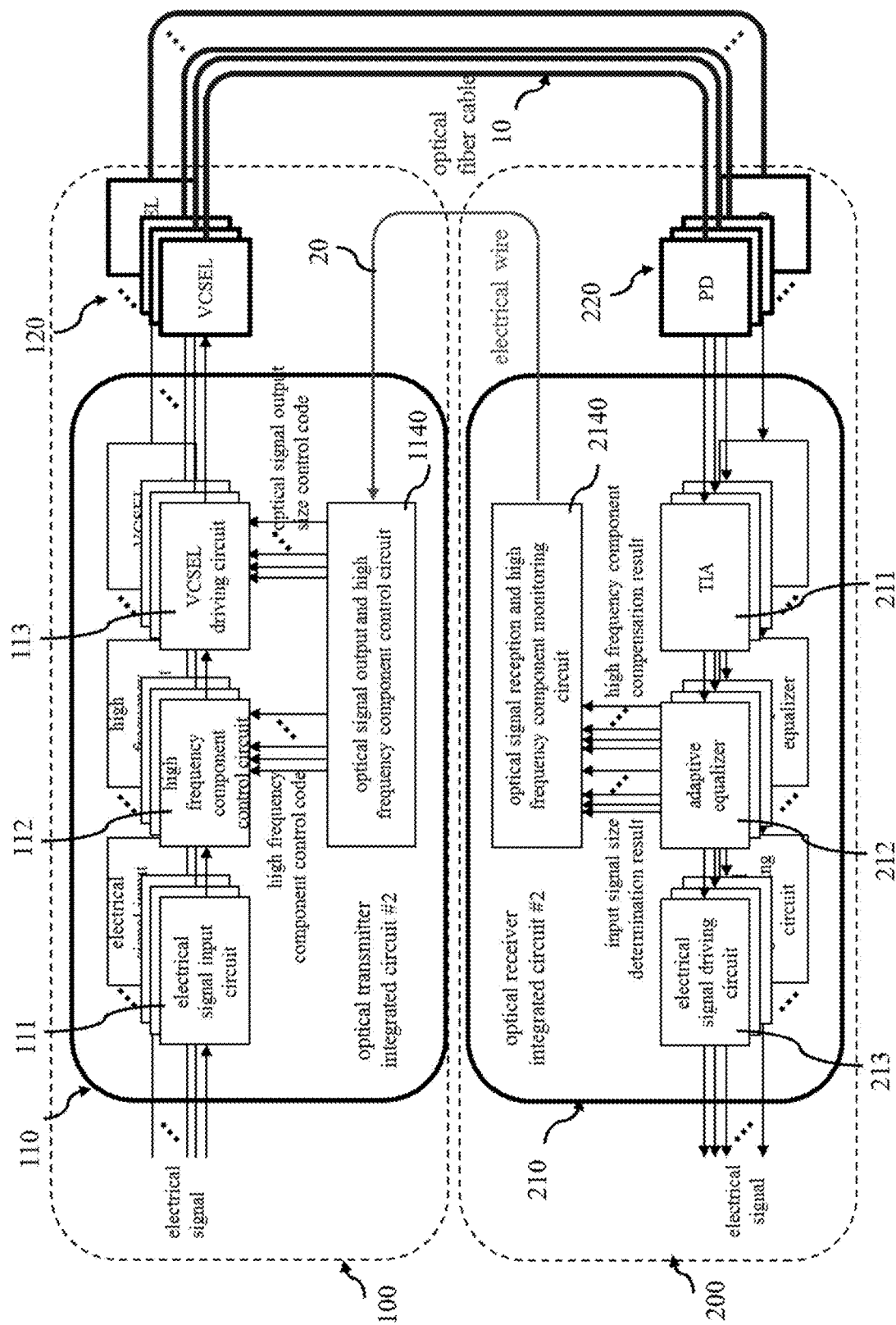
FIG. 6 is a detailed diagram for explaining the monitoring signal feedback in the AOC device without the MCU as shown in FIGS. 4 and 5.

FIG. 6 is a detailed diagram for explaining the monitoring signal feedback in the AOC device without the MCU as shown in FIGS. 4 and 5.

In the configurations shown FIGS. 4 to 6, the optical transmitter integrated circuit #2 110 comprises the optical signal output and high frequency component control circuit 1140, and the optical receiver integrated circuit #2 210 further comprises the optical signal receiving and high frequency component monitoring circuit 2140.

The first and second electrical wires 20 are respectively connected to the corresponding optical transmitter integrated circuit #2 110 and optical receiver integrated circuit #2 210 between the first connector 100 and the second connector 200. The monitoring signal feedback between the optical signal output and high frequency component control circuit 1140 and the optical signal receiving and high frequency component monitoring circuit 2140 is achieved through the first and second electrical wires 20.

Although the optical transmitter integrated circuit #1 and the optical receiver integrated circuit #1 of FIGS. 1 to 3 have are different in configurations from the optical receiver integrated circuit #2 and the optical receiver integrated circuit #2 of FIGS. 4 and 5, they are depicted by the same reference numerals for the convenience of description.

Figure 7:
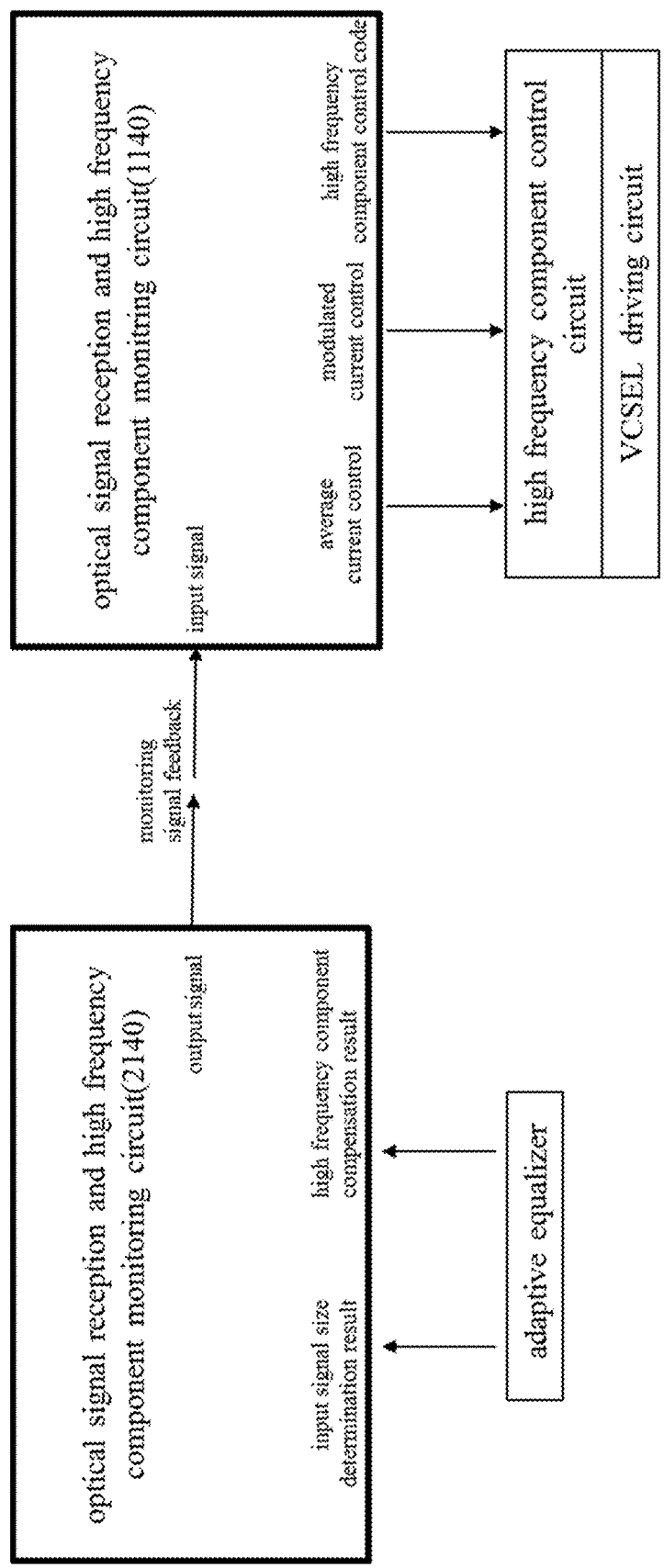
FIG. 7 is a diagram for explaining the monitoring signal feedback in the AOC device without the MCU according to the present invention.

FIG. 7 is a diagram for explaining the monitoring signal feedback in the AOC device without the MCU according to the present invention.

The optical signal receiving and high frequency component monitoring circuit 2140 included in the optical receiver integrated circuit #2 210 of the receiver collects the result of input signal size determination and high frequency component compensation from the adaptive equalizer 212 as a monitoring signal. The monitoring signal is transmitted to the transmitter through the electrical wire 20.

The optical signal and high frequency component control circuit 1140 included in the optical transmitter integrated circuit #2 110 of the transmitter receives the feedback monitoring signal through the electrical wire 20.

Based on the feedback monitoring signal, the high frequency component control code and the optical signal output size control code are respectively input in high frequency component control circuit 112 and the VCSEL driving circuit 113 as a control signal.

In the present invention, the VCSEL device is used as the optical device for optical output 120. The VCSEL is used for short-range optical communication as it has a simple drive circuit by direct modulation, low manufacturing cost and low power consumption (about ⅓ of DFB Laser). In addition, it has a forward connection structure and outputs an optical signal in proportion to current.

The PD device is used as the optical device for optical reception 220. The PD can easily obtain bandwidth relative to VCSEL. It has a reverse connection structure and outputs current in proportion to an optical signal. Since the current is a micro-current, the TIA (Trans-impedance Amplifier) 211 is required to convert the current to a voltage signal.

For short-range optical communication using VCSEL, the optical fiber cable 10 uses MMF (Multi-Mode Fiber), as a product wherein a cable bundle is wrapped in a single sheath.

The optical parts 103 and 203 stably guide and protect an optical path through which an optical signal travels between the optical device and the optical fiber.

In the AOC device, all optical devices, optical parts and electronic parts are integrated in a connector unit. The electrical parts 101 and 201 may have a structure for connecting a cable to a terminal, or the integrated PCB may be directly connected to the terminal.

The MCU (Micro-Control Unit) 130 and 230 is an integrated circuit for processing a digital signal. It is used for inputting initial setting values of the optical transmitter integrated circuit and the optical receiver integrated circuit, and in the present invention, it is configured to further comprise the function of performing the feedback a monitoring signal from the receiver to the transmitter.

The high frequency component control circuit 112 of the optical transmitter integrated circuits #1 and #2 controls high frequency component reinforcement on an input signal input from the electrical signal input unit 111 and outputs an output signal.

Figure 8:
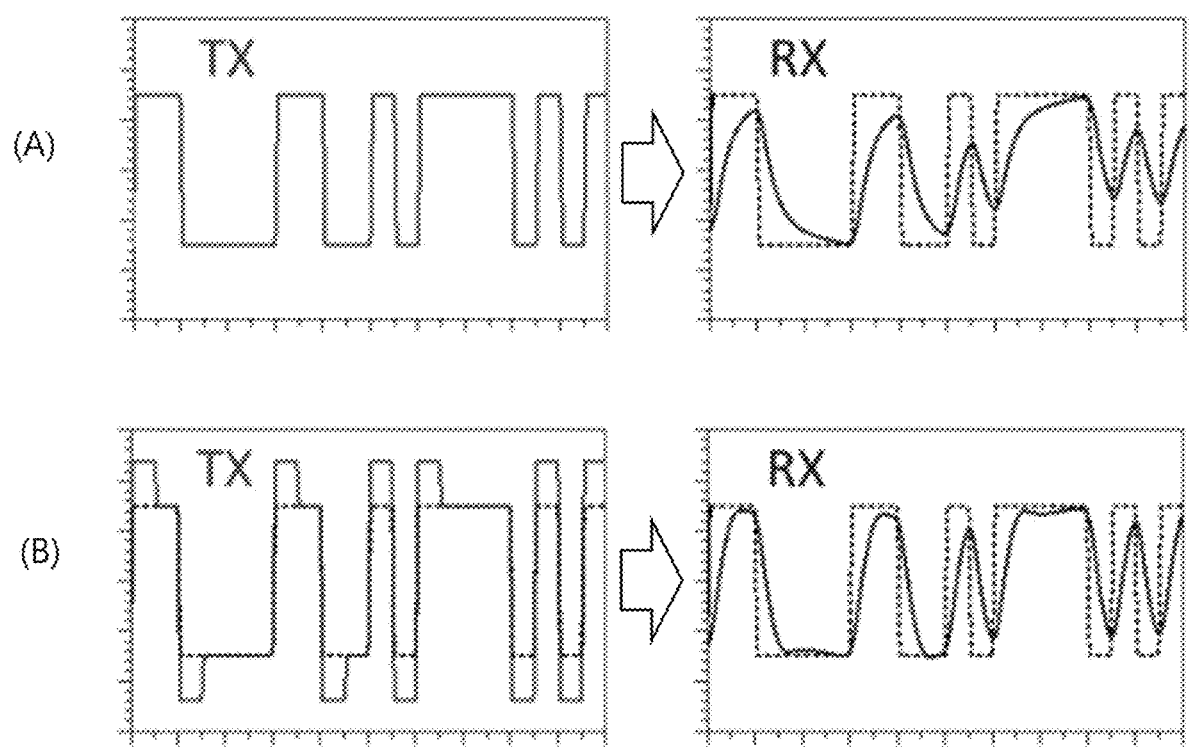
FIG. 8 is a diagram for explaining the high frequency component control circuit of the optical transmitter integrated circuit according to the present invention.

FIG. 8 is a diagram for explaining the high frequency component control circuit of the optical transmitter integrated circuit according to the present invention.

As shown in FIG. 8A, as a signal transmitted from the transmitter (TX) passes through the channel, a high frequency component is attenuated and distorted. The receiver (RX) receives a signal in which the high frequency component is lack. To compensate this attenuation of the high frequency component, the high frequency component is reinforced in the transmitter (TX) as shown in FIG. 8B. Again, this distortion of the high frequency component is reduced in the transmitter (TX), and the receiver (RX) receives a signal which is close to the original signal.

As such, the high frequency component control circuit 110 of the transmitter distorts intentionally the high frequency component to reinforce it.

The VCSEL driving circuit 120 drives current to convert an electrical signal inside the integrated circuit into an optical signal through VCSEL. Depending on a control signal, it has an average current control which controls the amount of current which always basically flows, and a modulation current control which controls the size of current in response to a signal.

In the present invention, the average current control and the modulation current control are performed by setting the optical signal output size control code based on the result of input signal size determination from the monitoring signal.

As another method in configuring the optical transmitter integrated circuit, the function of the high frequency component reinforcement control as well as the functions of the average current control and the modulation current control can be included in the VCSEL driving circuit, instead of providing a separate high frequency component. In this case, the high frequency component control circuit is omitted.

Meanwhile, the optical device for optical reception (PD) performs photoelectric conversion to output a micro-current signal. The TIA 211 receives the micro-current from the PD as an input signal and converts it into a voltage signal.

Next, the adaptive equalizer 212 continuously monitors the input signal size and the high frequency component, and optimally compensates the high frequency component of the receiver equalizing filter using the monitoring result. In the present invention, the result of input signal size determination in an adaptive algorithm is output. In addition, the optimal equalizing filter control code found in the adaptive algorithm is output as the result of high frequency component compensation.

Figure 9:
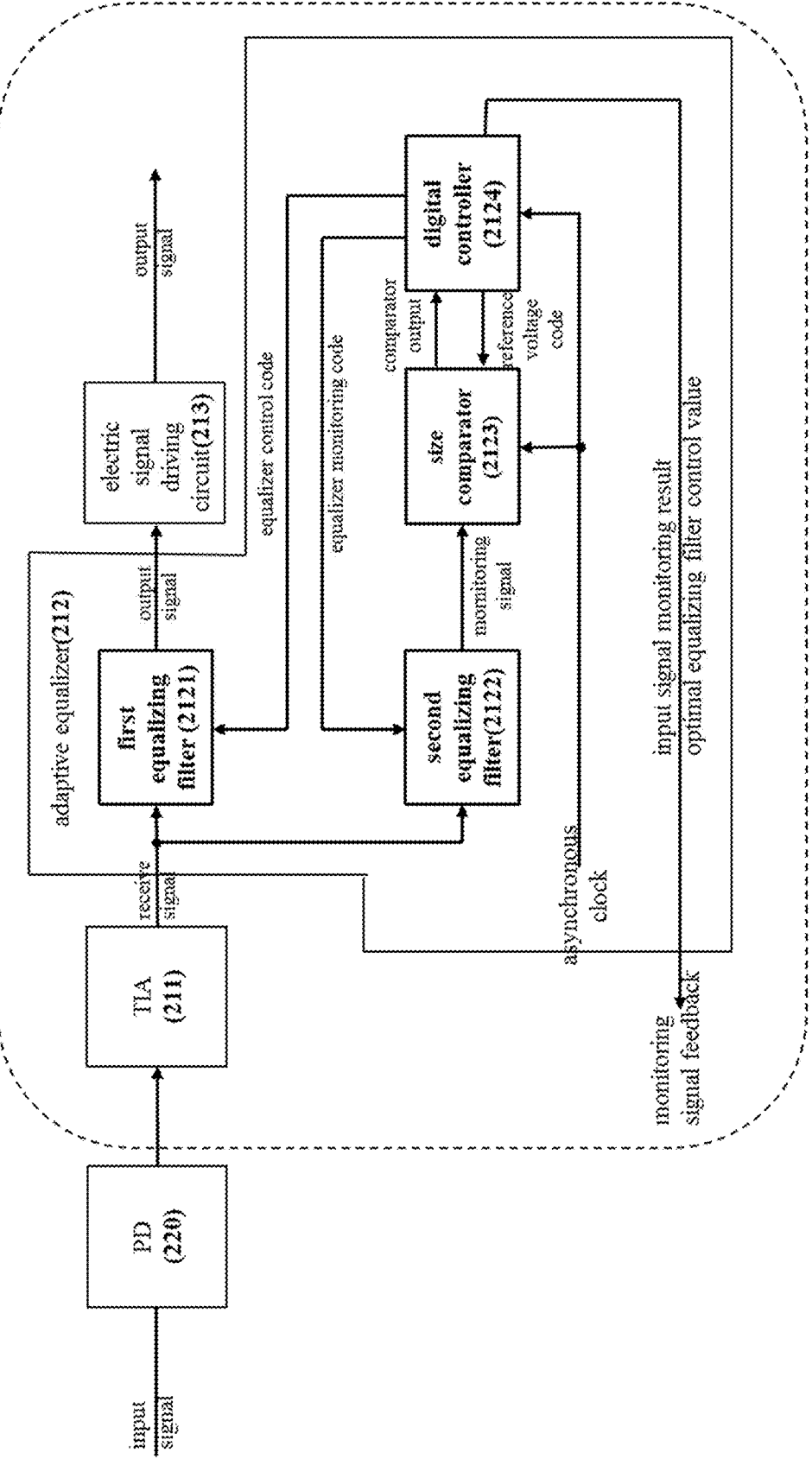
FIG. 9 is a schematic diagram of an adaptive equalizer of the optical receiver integrated circuit according to the present invention.

FIG. 9 is a schematic diagram of an adaptive equalizer of the optical receiver integrated circuit according to the present invention.

The adaptive equalizer 212 comprises the first equalizing filter 2121 configured to output a compensated high frequency component of a receiving signal by an equalizer control code; the second equalizing filter 2122 configured to receive the receiving signal in parallel with the first equalizing filter 2121 and output the compensated high frequency component as a monitoring signal by an equalizer monitoring code; the size comparator 2123 configured to compare a size of the monitoring signal from the second equalizing filter 2122 with a reference voltage set by a reference voltage code; and the digital control unit 2124 configured to convert an output sampled from the size comparator 2123 by varying the equalizer monitoring code provided to the second equalizing filter 2122 and the reference signal in the size comparator 2123 to digital data and find the optimal equalizer control code based on the digital data, thereby controlling the equalizer control code of the first equalizing filter 2121.

The first equalizing filter 2121 may output a compensated component of high frequency band of the receiving signal. The equalizer control code is input in the first equalizing filter 2121 from the digital control unit 2124.

The first equalizing filter 2121 may select an equalization coefficient in response to the equalizer control code and perform equalization for an equalization gain corresponding to the selected equalization coefficient.

The second equalizing filter 2122 is provided in parallel with the first equalizing filter 2121 at a unit for the receiving signal.

As in the first equalizing filter 2121, the second equalizing filter 2122 has the function of outputting a compensated component of high frequency band of the receiving signal. Thus, the second equalizing filter 2122 may be considered as having the same operation characteristic as the first equalizing filter 2121.

Meanwhile, the second equalizing filter 2122 may be referred to as an equalizing filter only for signal monitoring. The second equalizing filter 2122 performs monitoring to find the optimal equalizer control code that can compensate the receiving signal to be its optimal state depending on the equalizer monitoring code of the digital controller 2124.

That is, the second equalizing filter 2122 may output the receiving signal compensated depending on the equalizer monitoring code of the digital controller 2124, thereby finding the optimal equalizer control code in the digital controller 2124. The signal output from the second equalizing filter 2122 may be referred to as a monitoring signal.

The first equalizing filter 2121 and the second equalizing filter 2122 may comprise an input signal unit, an output signal unit, a low-frequency gain control unit, and a high frequency gain control unit, respectively. The low frequency gain control unit acquires a signal to control an amount of amplifying a low frequency band of a signal, and the high frequency gain control unit acquires a signal to control an amount of amplifying a high frequency band of a signal. The low frequency gain control can control a size of an input signal and amplification gain. The high frequency gain control can control a transition rate of an input signal and change a waveform of the signal.

The equalizer control code of the digital controller 2124 is input in the low frequency gain control unit or the high frequency gain control unit of the first equalizing filter 2121 as needed. The equalizer monitoring code of the digital controller 2124 is also input in the low frequency gain control unit or the high frequency gain control unit of the second equalizing filter 2122 as needed. That is, for amplification gain of an input signal in the second equalizing filter 2122, a desired equalizer monitoring code may be input in the low frequency gain control unit. To change a waveform of the input signal in the second equalizing filter 2122 (to control a signal transition rate), a desired equalizer monitoring code may be input in the high frequency gain control unit.

The size comparator 2123 acquires a desired clock signal (e.g., asynchronous clock), the monitoring signal from the second equalizing filter 2122, and the reference signal control code from the digital controller 2124.

Thus, the size comparator 2123 measures (performs sampling) a size of the input signal (monitoring signal) from the second equalizing filter 2122 every cycle of the input clock signal (asynchronous clock). In other words, the size comparator 2123 may perform sampling of the input signal every cycle of the clock signal (asynchronous clock) and digitally output high/low as compared with the reference voltage controlled digitally.

The digital controller 2124 may provide the equalizer control code to the first equalizing filter 2121, the equalizer monitoring code (also referred to as a high frequency band gain control code) to the second equalizing filter 2122, and the reference signal control to the size comparator 2123.

Next, the digital controller 2124 collects comparison data in the size comparator 2123 by varying the equalizer monitoring code provided to the second equalizing filter 2122 and the reference signal in the size comparator 2123, and continuously performs the operation of finding the optimal equalizer control code based on the collected comparison data. The obtained optimal equalizer control code is applied to the first equalizing filter 2121.

That is, the digital controller 2124 varies the equalizer monitoring code provided to the second equalizing filter 2122 (e.g., referred to as a high frequency band gain code input in the high frequency gain control unit) and the reference signal control code provided to the size comparator 2123, and counts the number of 'high' in the comparison data for each time.

Then, the digital controller 2124 calculates a difference between the current counting value and the previous counting value to determine the maximum peak value on a probability density function (PDF) as the optimal value and provide the corresponding equalizer control code to the first equalizing filter 2121.

As such, the digital controller 2124 may adjust a size of the input signal of the adaptive equalization device, observe the characteristics of the second equalizing filter 2122 based on the adjusted input signal, find the optimal high frequency band gain code (i.e., equalizer control code), and apply the obtained code to the first equalizing filter 2121.

Figure 10:
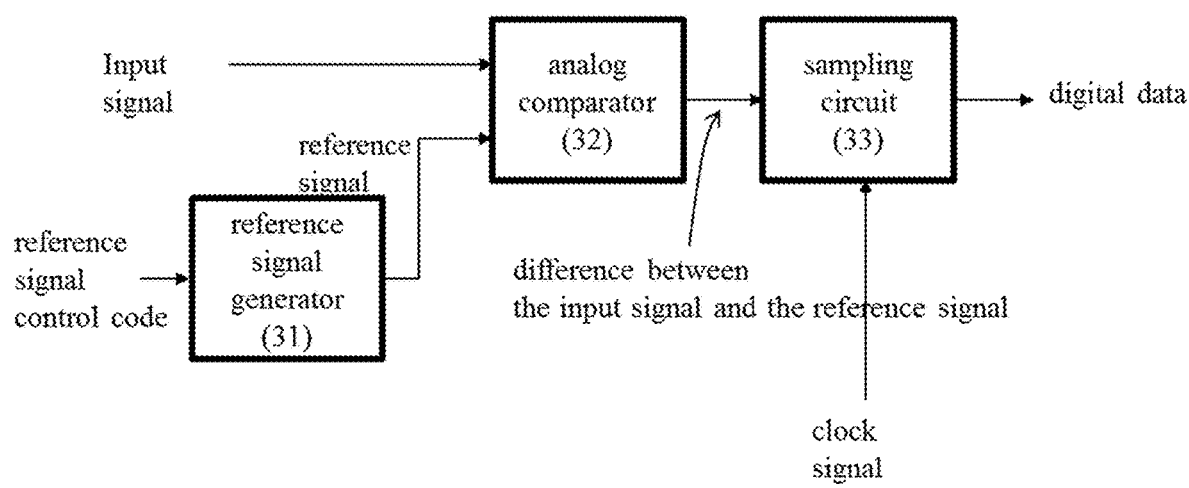
FIG. 10 is a diagram for explaining a size comparator of an adaptive equalizer according to the present invention.

FIG. 10 is a diagram for explaining the size comparator of the adaptive equalizer according to the present invention.

The size comparator 2123 may comprise the reference signal generator 31, the analog comparator 32, and the sampling circuit 33.

The reference signal generator 31 generates an analog component reference signal (also referred to as a reference voltage) corresponding to a reference signal control code from the digital controller 2124. Herein, the reference signal control code is a code for determining a level of the reference voltage, and may be any one of about 16 codes having different levels, for example.

Thus, the reference signal control code applied to the reference signal generator 31 may be any one of about 16 codes having different levels. The reference signal output from the reference signal generator 31 depends on the reference signal control code.

The analog comparator 32 acquires a difference between the input signal (i.e., the monitoring signal from the second equalizing filter 2122) and the reference signal from the reference signal generator 31 and outputs it as an analog signal.

The sampling circuit 33 performs sampling of an output from the analog comparator 32 every cycle of an input clock signal (e.g., asynchronous clock) and outputs it as a digital form. Thus, the sampling circuit 33 may output a desired digital data (e.g., high or low).

Herein, the clock signal is a signal that provides a time point to perform a comparison, and a rising edge or a falling edge may be generally used.

The reference signal generator 31, the analog comparator 32, and the sampling circuit 33 have been separately provided herein, but these components may be integrated as necessary.

In the configuration as described above, the size comparator 2123 compares the size of the input signal with the reference signal generated internally. In addition, the size comparator 2123 performs sampling each cycle of the clock signal, determines the size, and outputs the corresponding digital data. The reference signal for comparison depends on the corresponding control.

Meanwhile, the size comparator 2123 may performs a comparison in a way of generating a signal as a difference obtained by subtracting the reference signal from the input signal and using 0 (zero) as the reference.

When the size comparator 2123 receives an asynchronous clock, the size comparator 2123 may perform random sampling of the input signal. In this case, the probability that the input signal is high/low is 50:50. As the sampling is not performed at a specific time point of each input signal bit, a sampling value can be obtained at a random time point. There is no data at the time of sampling, but data on the distribution of sampling voltages (i.e., it allows counting the number of highs and lows in the comparison data) can be obtained.

If the clock is asynchronous and random sampling is used, so a slower clock can be used. By using a slower, asynchronous clock, a burden on operating speed is reduced, which can result in smaller power consumption and smaller circuits.

Figure 11:
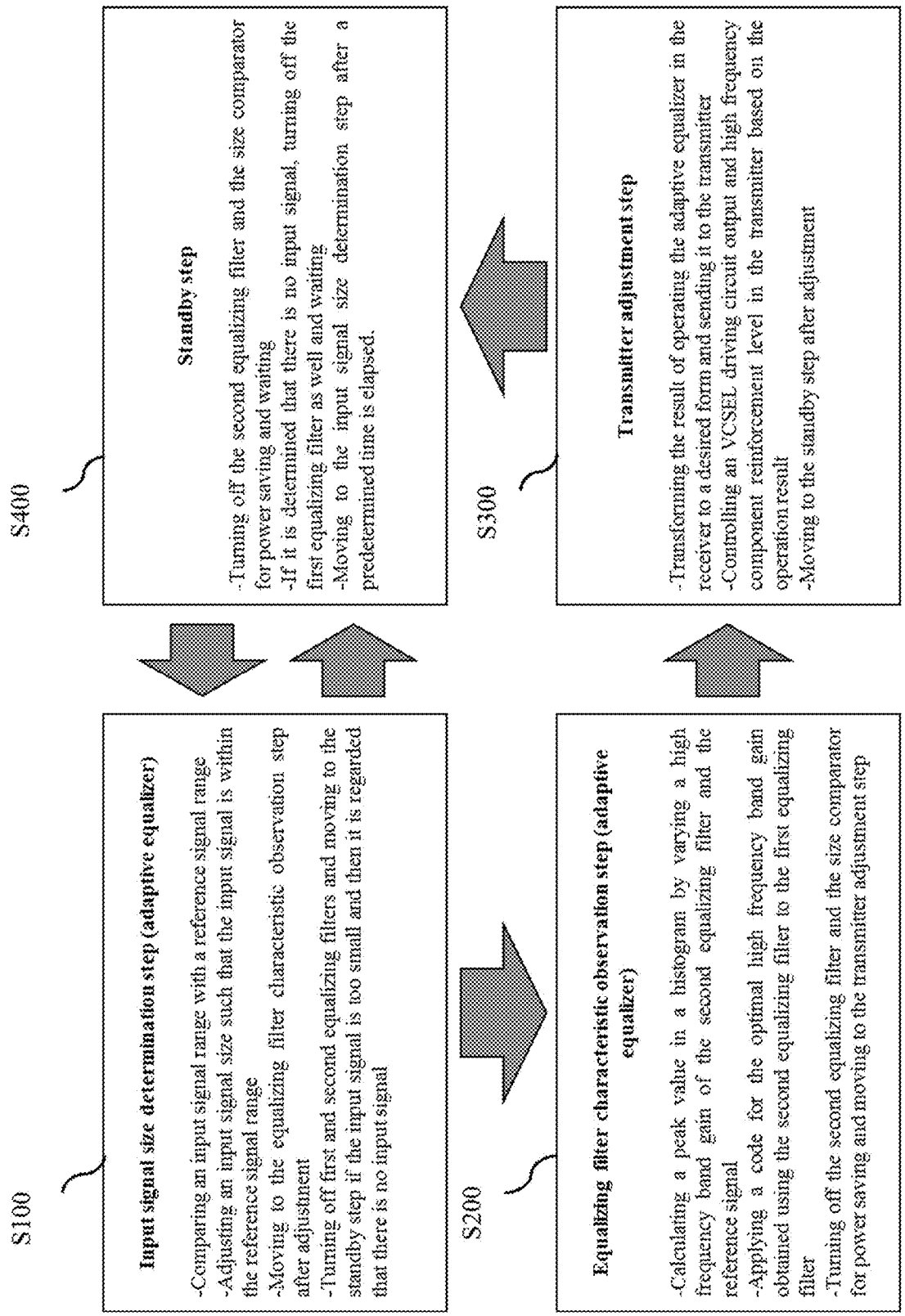
FIG. 11 is a diagram for explaining the procedure of operating an AOC device according to an embodiment of the present invention.

FIG. 11 is a diagram for explaining the procedure of operating the AOC device according to an embodiment of the present invention.

The method of the present invention comprises the step of determining an input signal size in the adaptive equalizer of the receiver (S100), the step of observing the characteristics of the equalizing filter (S200), the step of adjusting the transmitter by performing the feedback of the result of equalizing filter characteristic observation to the transmitter as a monitoring signal (S300), and the standby step for power saving (S400), wherein these steps are circulated.

According to an embodiment of the present invention, the adaptive equalization method is performed in the adaptive equalization device as described with reference to FIGS. 9 and 10.

The input signal size determination step (S100) is a size calibration step for the input signal. After a range of the signal (monitoring signal) input in the size comparator 2123 is compared with a range of the internally generated reference signal, the input signal size is adjusted so that the input signal is approximately ½ of the reference signal range. After the input signal size is adjusted, the process moves to the equalizing filter characteristic observation step (S200). If the input signal is too small and then it is determined that there is no signal, the process moves to the standby step (S400).

The reason for adjusting the input signal size so that the input signal is approximately ½ of the reference signal range (i.e., between the maximum value and the minimum value of the reference signal) in the input signal size determination step (S100) is because the accuracy in the equalizing filter characteristic observation step (S200) is lowered if the input signal is too large or too small. That is, when the input signal is approximately ½ of the reference signal range, the characteristic of the second equalizing filter 30 to be monitored can be better observed, and the optimal equalizer control code can be provided to the first equalizing filter 2121.

As described above, it is needed to perform an input signal amplitude calibration such that the input signal is adjusted to approximately ½ of the reference signal range.

As the input signal calibration method, a method of gradually increasing amplification gain of the second equalizing filter 2122 or a method of reducing the reference signal range may be employed.

First, the method of finding a gain larger than the reference signal while gradually increasing the amplification gain of the second equalizing filter 2122 will be described with reference to FIG. 12.

Figure 12:
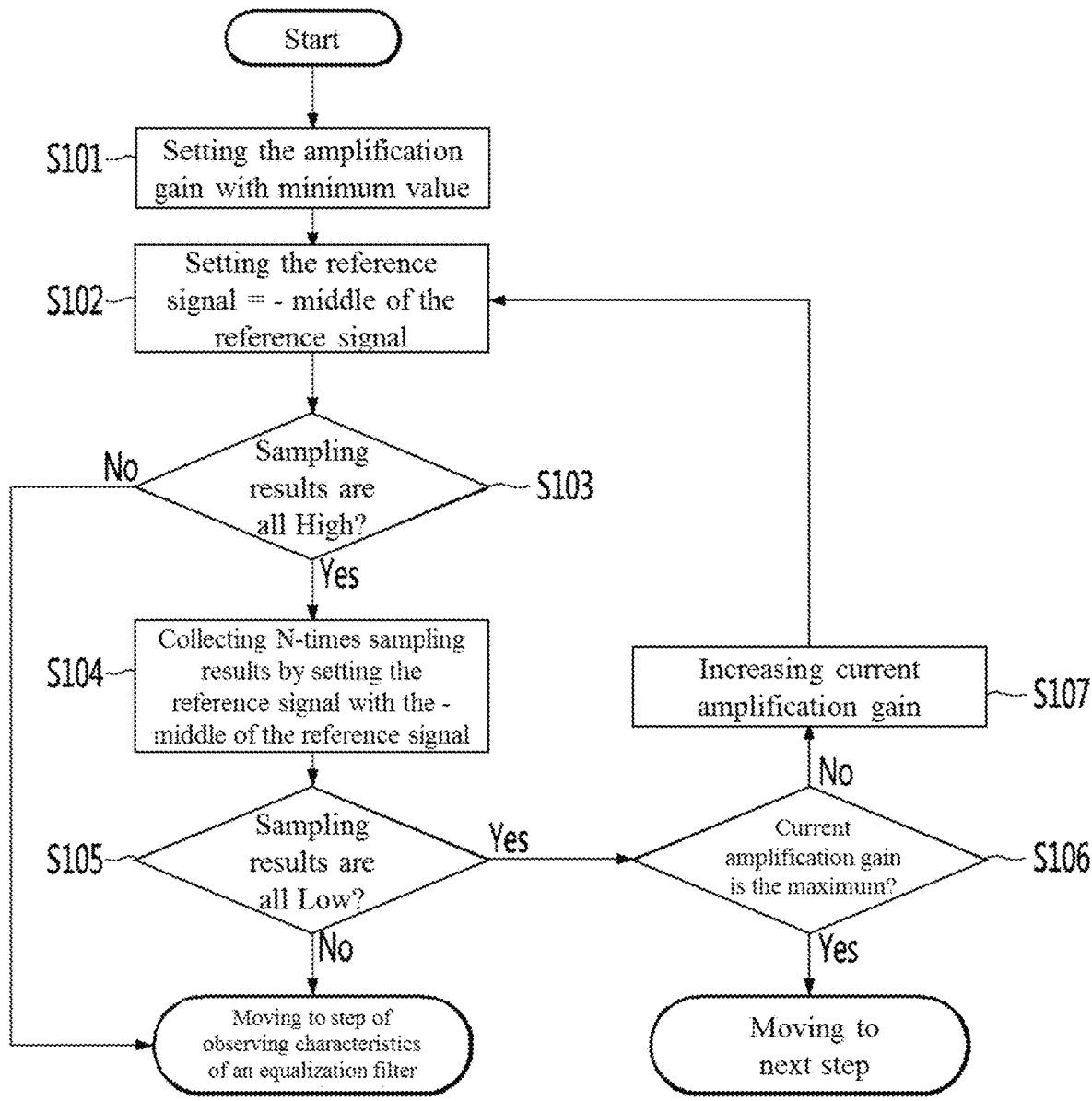
FIG. 12 is a specific diagram for explaining a method of calibrating an input signal by an amplification gain adjustment according to the present invention.

FIG. 12 is a specific diagram for explaining a method of calibrating the input signal by an amplification gain adjustment according to the present invention.

Referring to FIG. 12, first, in the digital controller 2124, the amplification gain from the second equalizing filter 2122 is set to the minimum (S101). Then, after "the reference signal=−reference signal middle" is set, the results of N samplings performed in the size comparator 2123 are collected (S102). If the results of samplings in step S102 (i.e., comparison values in the size comparator 2123) are not all high, the digital controller 2124 moves to the equalizing filter characteristic observation step (S200).

If the sampling results in step S102 (i.e., comparison values in the size comparator 2123) is all high ("Yes" in S103), the digital controller 2124 sets "the reference signal=+reference signal middle" and collects the results of N samplings performed in the size comparator 2123 (S114). If the sampling results in step S104 (i.e., comparison values in the size comparator 2123) is all low ("Yes" in S105), the digital controller 2124 determines whether the current amplification gain is the maximum (S106). If the current amplification gain is not the maximum, the digital controller 2124 increases the current amplification gain (S107), and returns to said step S102 to repeat the operation of this step.

If the sampling results in step S105 (i.e., comparison values in the size comparator 2123) is not all low, the digital controller 2124 moves to the equalizing filter characteristic observation step (S200). If the amplification gain in step S106 is the maximum, the digital controller 2124 moves to the standby step (S300).

As such, the magnitude of the input signal can be compared by finding a case that the gain is larger than the reference signal while gradually increasing the amplification gain of the second equalizing filter 2122.

Meanwhile, there is also a method of adjusting the reference signal to calibrate the input signal.

Figure 13:
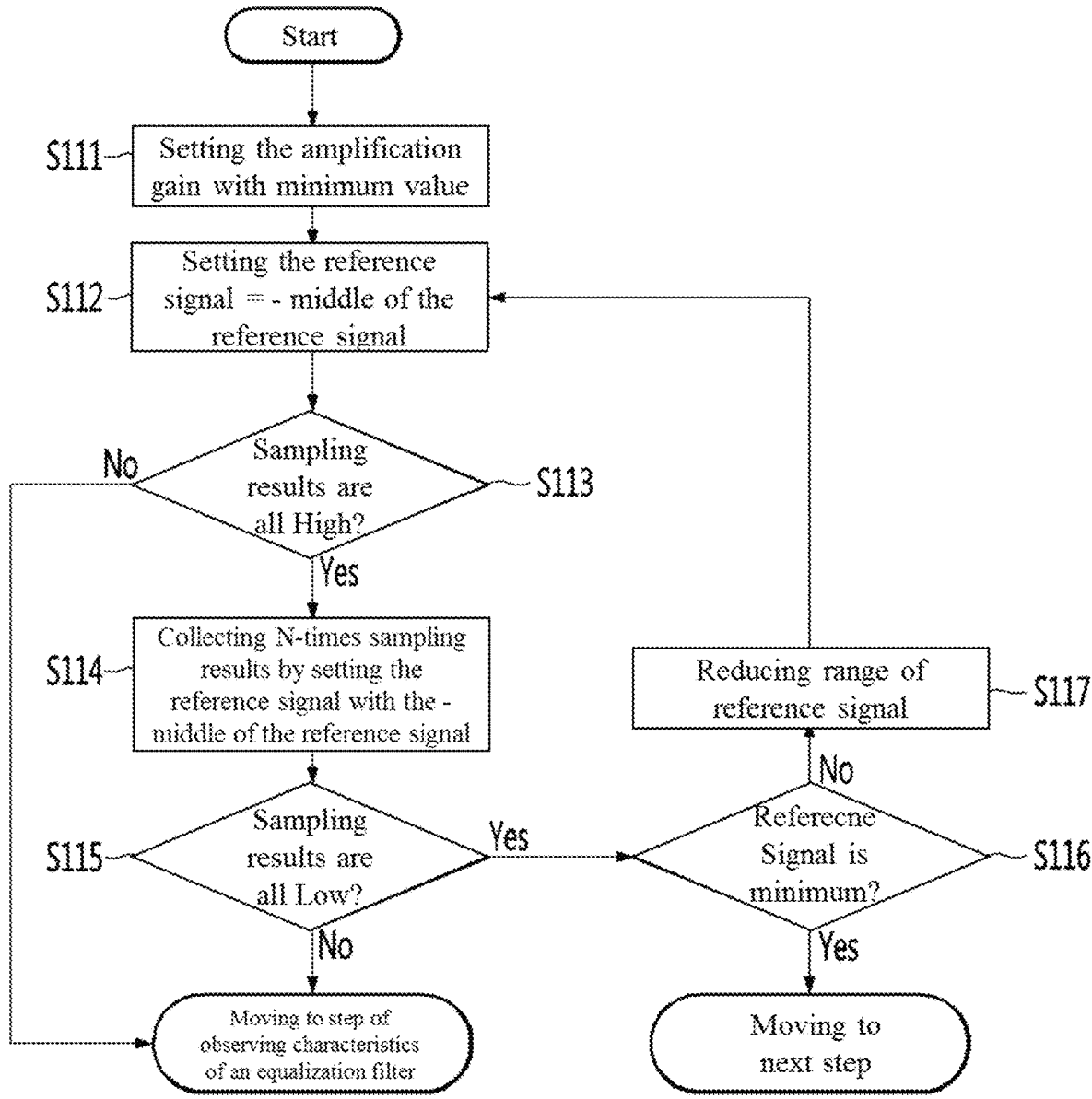
FIG. 13 is a specific diagram for explaining a method of calibrating an input signal by a reference signal adjustment according to the present invention.

FIG. 13 is a specific diagram for explaining a method of calibrating the input signal by a reference signal adjustment according to the present invention.

Referring to FIG. 13, first, in the digital controller 2124, a range of the reference signal from the size comparator 2123 is set to the maximum (S111). Then, after "the reference signal=−reference signal middle" is set, the results of N samplings performed in the size comparator 2123 are collected (S112). If the results of samplings in step S112

(i.e., comparison values in the size comparator 2123) are not all high, the digital controller 2124 moves to the equalizing filter characteristic observation step (S200).

If the sampling results in step S112 (i.e., comparison values in the size comparator 2123) is all high ("Yes" in S113), the digital controller 2124 sets "the reference signal=+reference signal middle" and collects the results of N samplings performed in the size comparator 2123 (S114). If the sampling results in step S114 (i.e., comparison values in the size comparator 2123) is all low ("Yes" in S115), the digital controller 2124 determines whether the current reference signal range is the minimum (S116). If the current reference signal range is not the minimum, the digital controller 2124 decreases the current reference signal range (S117), and returns to said step S112 to repeat the operation of this step.

If the sampling results in step S115 (i.e., comparison values in the size comparator 2123) is not all low, the digital controller 2124 moves to the equalizing filter characteristic observation step (S200). If the reference signal range in step S116 is the minimum, the digital controller 2124 moves to the standby step (S300).

As such, the magnitude of the input signal can be compared by finding a case that the input signal is larger than the reference signal range while adjusting the reference signal range of the magnitude comparator 2123.

In this way, the input signal is adjusted to be within ½ of the reference signal range by a calibration of the input signal. When the input signal calibration is completed, the equalizing filter characteristic observation step may be performed.

In the equalizing filter characteristic observation step (S200), a histogram's peak value is calculated by varying the high frequency band gain or reference signal of the second equalizing filter 2122, and a code for the optimal high frequency band gain (i.e., equalizer control code), which is found using the second equalizing filter 2122, is applied to the first equalizing filter 2121. Then, a flag indicating that the adaptation of the adaptive equalizer has been completed is displayed and the process moves to the standby step (S400). Herein, the equalizing filter characteristic observation step (S200) may be referred to as an equalizer control code application step.

In the transmitter adjustment step (S300), the operation result of the adaptive equalizer of the receiver is converted into a desired form and transferred to the transmitter. Based on the operation result, the transmitter controls the VCSEL driver circuit output and the high frequency component reinforcement level. When the adjustment is completed, the process moves to the standby step.

The standby step (S400) (i.e., standby mode) shuts off the power supplies of the second equalizing filter 2122 and the size comparator 2123 to reduce power consumption following the equalizing filter characteristic observation step (S200). In addition, when it is determined in the input signal size determination step (S100) that there is no signal, the power supply of the first equalizing filter 2121 is also shut off. After a predetermined time elapses, the process moves to the input signal size determination step (S100).

The above-described steps, that is, the input signal size determination step (S100), the equalizing filter characteristic observation step (S200), the monitoring signal feedback in the transmitter adjustment step (S300), and the standby step (S400) may be sufficiently performed under the control of the digital controller 2124.

Figure 14:
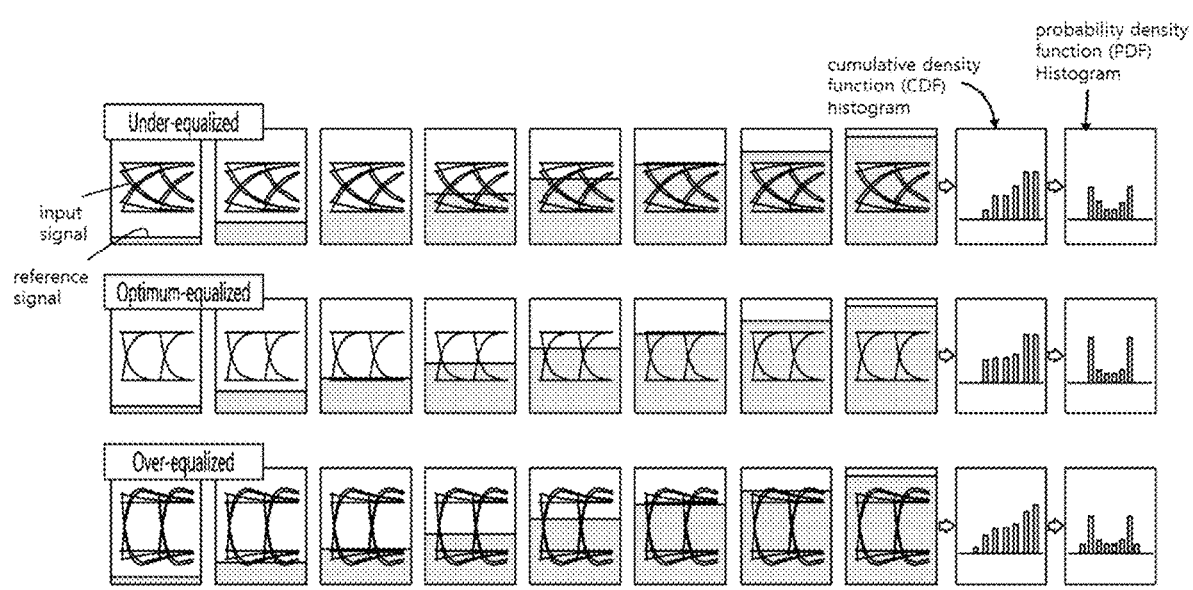
FIG. 14 is a diagram for explaining an equalizing filter characteristic observation step according to the present invention.

FIG. 14 is a diagram for explaining the equalizing filter characteristic observation step according to the present invention. As the first equalizing filter 2121 and the second equalizing filter 2122 have the same characteristics, the characteristics of the first equalizing filter 2121 may be observed only by observing the characteristics of the second equalizing filter 2122.

Referring to FIG. 14, when the reference signal (i.e., reference voltage Vref) is lower than the input signal range, all are low and a counting value is 0. When the reference voltage is within the input signal range, the corresponding comparison data is counted and the counting value is gradually increased. When the reference voltage is higher than the input signal range, all are high and the counting value is the number of samplings. The counting value is in the form of a cumulative density function (CDF), and a difference between adjacent counting values is expressed in the form of a probability density function (PDF). The cumulative density function (CDF) and the probability density function (PDF) may be represented by a histogram.

The probability density function (PDF) represents a probability that the input signal stays between reference voltages. Basically, since digital data from the size comparator 2123 has a high or low value, the probability of staying at a high or low voltage is high. Thus, a peak value is obtained in the probability density function (PDF), as shown in FIG. 14.

A size of the peak in the probability density function (PDF) depends on whether high frequency components are over or under. FIG. 14 shows how the adaptive equalization device finds the most optimal state according to a case where the transition rate of the data is slow, too fast or optimal. When the transition rate of data is slow, it corresponds to 'under-equalized' in FIG. 14. When the transition rate of data is too fast, it corresponds to 'over-equalized' in FIG. 14. Finally, when the transition rate of data is optimal (suitable), it corresponds to 'optimum-equalized' in FIG. 14.

For example, if high frequency components are lacking (i.e., under-equalized), the data transition is slower than the optimal state (i.e., optimum-equalized), so that the probability of staying at the median is high. Thus, the probability density function (PDF) between high and low increases, and the peak decreases. Conversely, if high frequency components are excessive (i.e., over-equalized), bounce is produced more than high/low at data transition than in optimal state (i.e., optimal-equalized). Thus, the probability density function (PDF) outside the high and low increases, and the peak decreases.

As such, while the high frequency band gain of the second equalizing filter 2122 is varied, the maximum peak value on the probability density function (PDF) becomes the optimal value.

By the equalizing filter characteristic observation step (S200) according to the present invention, the amount of data stored can be greatly reduced. This is for the following reason: in an embodiment of the present invention, after X samplings are performed and a difference from the previous counting value is calculated, if the difference is the maximum, it is stored (recorded), but if not, it is discarded.

In addition, in an embodiment of the present invention, the operation may be changed to be continuously circulated. In an embodiment of the present invention, the second equalizing filter 2122 only for monitoring is added to allow continuous equalizing filter adaptation.

Next, the above-described equalizing filter characteristic observation step (S200) will be described in more detail with reference to FIGS. 15 and 16.

Figure 15:
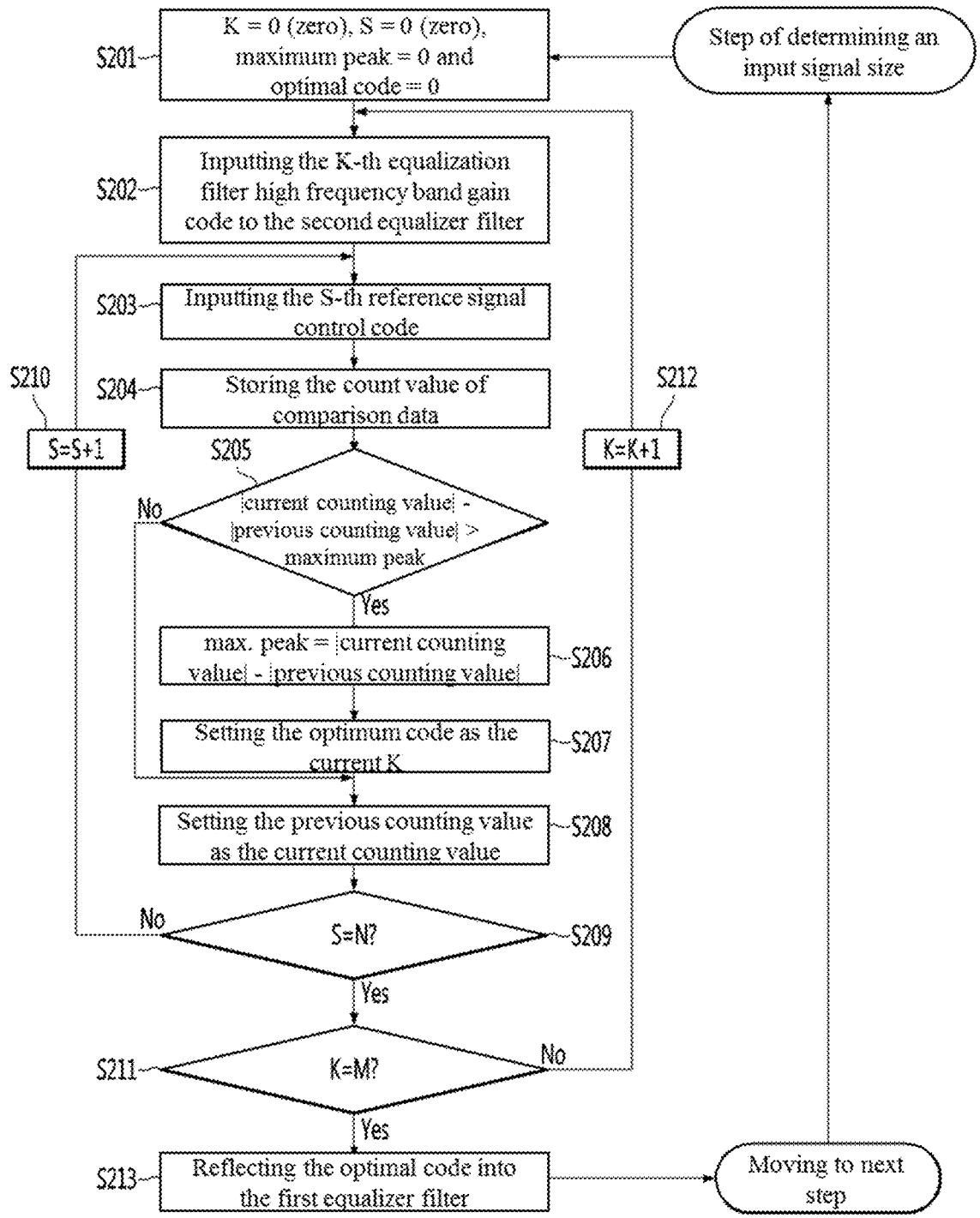
FIG. 15 is a flowchart for explaining an adaptive equalization control according to the present invention.

FIG. 15 is a flowchart for explaining an adaptive equalization control according to the present invention and FIG.

16 is a specific diagram for explaining an adaptive equalization method according to the present invention.

First, the digital controller 2124 is set to K=0 (zero), S=0 (zero), maximum peak=0 (zero), and optimal code=0 (zero) (S201), and a $K_{th}$ equalizing filter high frequency band gain code is input in the second equalizing filter 2122 (S202). Herein, K may be the equalizing filter high frequency band gain code (i.e., equalizer monitoring code which is applied to the second equalizing filter 2122), and S may be the reference signal control code.

Then, a $S_{th}$ reference signal control code is input in the magnitude comparator 2123 by the digital controller 2124 (S203). Accordingly, the reference signal (reference voltage) which corresponds to the $S_{th}$ reference signal control code (i.e., $0_{th}$ reference signal control code) will be generated in the magnitude comparator 2123.

Then, in the digital controller 2124, the results of X samplings performed in the size comparator 2123 are collected, the number of 'high' is counted from the collected results, and the counts are temporarily stored (S204). For example, when the $zero_{th}$ reference signal control code is applied to the magnitude comparator 2123, the input signal is compared with the reference signal corresponding to the $zero_{th}$ reference signal control code in the magnitude comparator 2123, and a value counting for the resulting data (value counting 'high' number) is temporarily stored in the digital controller 2124.

Subsequently, the digital controller 2124 determines whether the absolute value of the difference between the current counting value and the previous counting value is greater than the maximum peak (S205). If the absolute value of the difference between the current counting value and the previous counting value is greater than the maximum peak, the digital controller 2124 replaces the maximum peak with the absolute value of the difference between the current counting value and the previous counting value (S206).

Then, the digital controller 2124 assumes that the optimum code is the current K (S207), and renders the previous counting value to be the current counting value (S208).

Meanwhile, as a result of the determination in step S205, if the absolute value of the difference between the current counting value and the previous counting value is not greater than the maximum peak, the digital controller 2124 moves to step S208. In other words, X samplings are performed and a difference from the previous value is calculated. Then, if the difference is the maximum, the stored counting value is recorded, but if not, it is discarded.

Then, the digital controller 2124 determines whether "S=N" (S209). Herein, N means the maximum value of the reference signal control code. For example, N may be preset to "16".

If it is not "S=N", the digital controller 2124 performs "S=S+1" (S210), and then returns to step S203 to repeat the operation of this step. If the reference signal control code is sequentially increased, sequentially increased reference signals (reference voltages) are generated in the magnitude comparator 2123.

In contrast, when "S=N", the digital controller 2124 determines whether "K=M" (S211). Herein, M means the maximum value of the equalizing filter high frequency band gain code. For example, M may be preset to "8".

If not "K=M", the digital controller 2124 performs "K=K+1" (S212), and then returns to step S202 to repeat the operation of this step.

In contrast, when "K=M", the digital controller 2124 reflects the optimal code to the first equalizing filter 2121 as the equalizer control code which is optimal for the current state of the first equalizing filter 2121 (S213). Accordingly, when the equalizer control code is applied to the first equalizing filter 2121, the adaptive equalization device according to an embodiment of the present invention may be controlled to have the optimal equalization gain in real-time.

Figure 16:
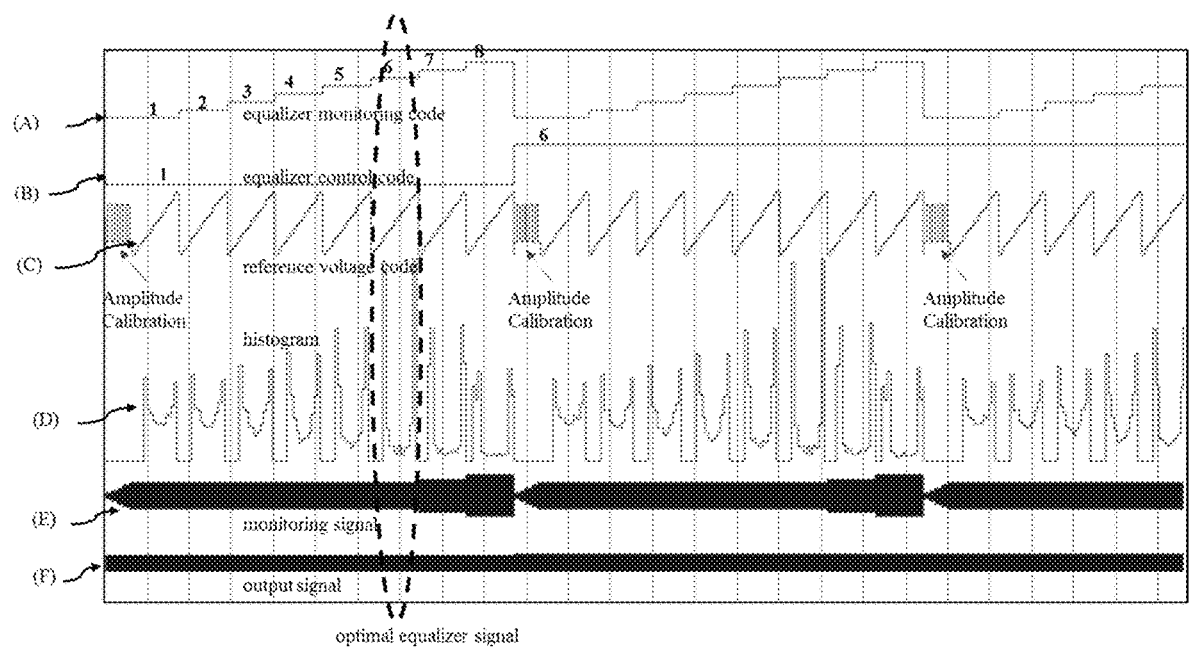
FIG. 16 is a specific diagram for explaining an adaptive equalization method according to the present invention.

FIG. 16 is a specific diagram for explaining a method of operating the adaptive equalizer according to the present invention. Referring to FIG. 16, the equalizer monitoring code (A) is varied from level 1 to level 8 in a stepwise manner. Herein, the equalizer control code of the first equalizing filter is set to an initial state (level 1). Then, the amplitude calibration step is performed to adjust a size of the input signal. The input signal is adjusted to ½ of the reference voltage signal range.

If the calibration step is completed, the reference voltage (C) is sequentially varied according to preset steps. For sampling, a size of the input signal is compared with each reference voltage (C) using an asynchronous clock and results are counted. A difference value between neighboring comparison values is calculated to derive a cumulative density function (CDF), and the cumulative density function (CDF) is converted into a probability density function (PDF) to generate a histogram (D).

Then, the equalizer monitoring code (A) is varied to the next level 2, and the reference voltage level is sequentially varied to generate a probability density function (PDF) histogram.

By repeating the above process, the equalizer monitoring code (A) is varied from level 1 to level 8, and histograms at each level are compared to find the maximum peak value. In FIG. 16, the histogram of the probability density function (PDF) shows the maximum peak value at equalizer monitoring code level 6. Thus, the optimal equalizer control code level 6 is obtained. The equalizer monitoring code level 6 is set as the equalizer control code for the first equalizing filter.

In this way, the monitoring control code and the reference voltage are varied to find the equalizer monitoring code that can give the optimal equalizer output and set it as the equalizer control code.

Accordingly, in the adaptive equalizer of the present invention, even when the equalizer control code is varied, the normal output can be continuously produced without a calibration section of the output signal. This is because the optimal equalizer control code can be set by monitoring a calibrated monitoring signal.

Figure 17:
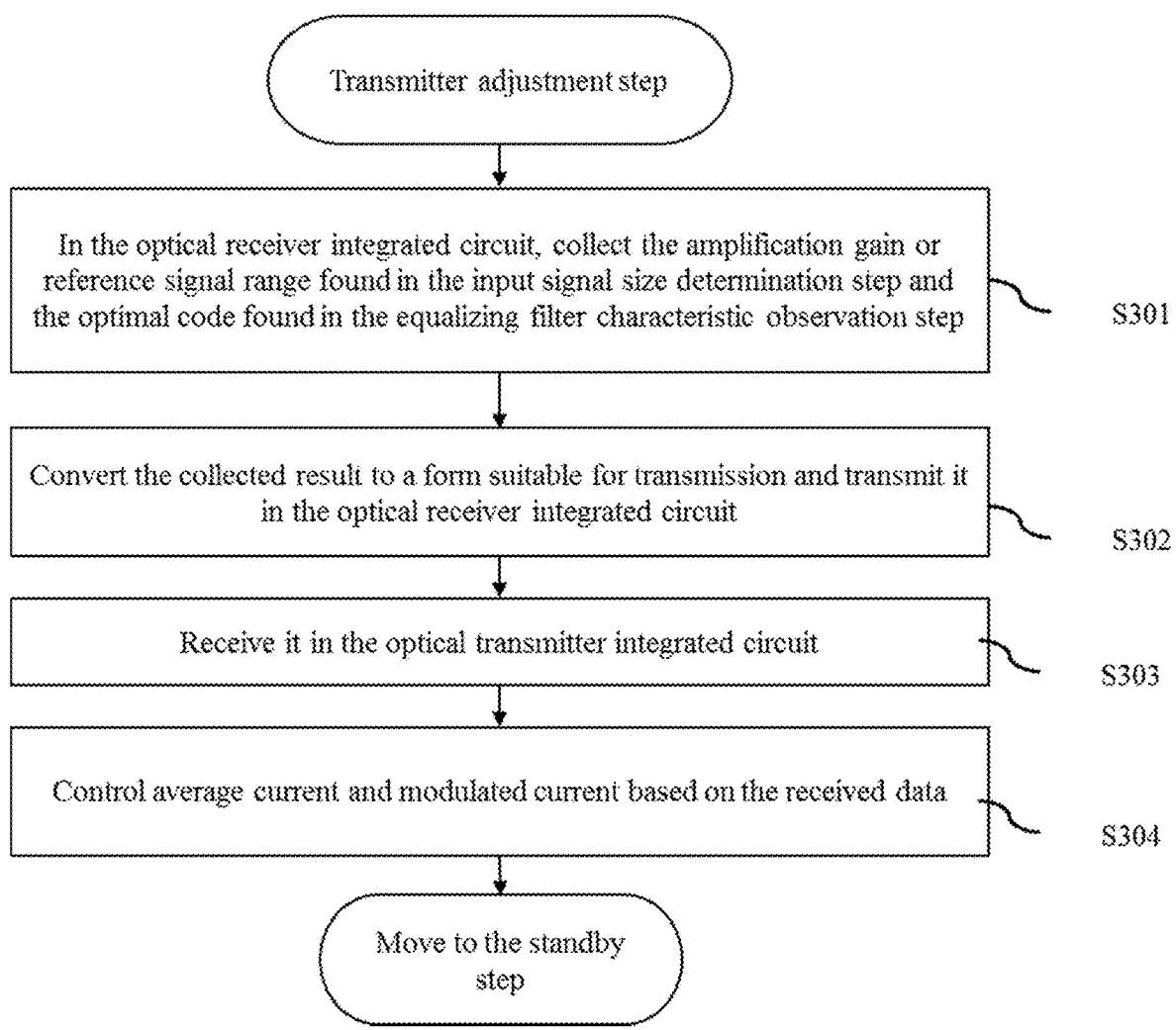
FIG. 17 is a flowchart for explaining a transmitter adjustment step according to the present invention.

FIG. 17 is a flowchart for explaining the transmitter adjustment step according to the present invention.

The feedback of a monitoring signal obtained from the optical receiver integrated circuit 210 to the transmitter is performed. A range of the amplification gain or reference signal from the input signal determination step (S100) and the optimal equalizer control code obtained in the equalizing filter characteristic observation step (S220) are combined as the monitoring signal 301. The monitoring signal is converted into a form suitable for sending it in the optical receiver integrated circuit and the converted signal is transmitted to the optical receiver integrated circuit (S302). That is, the feedback of the monitoring signal to the transmitter is performed. The monitoring signal is received in the optical transmitter integrated circuit of the transmitter (S302). Based on the received data, the optical transmitter integrated circuit controls an average current and a modulated current (S304).

As described above, the AOC device according to the present invention performs the feedback of the monitoring signal from the receiver to the transmitter. Based on the feedback monitoring signal, the transmitter can properly compensate the attenuated high frequency signal in real-time. Overall, the AOC device according to the present invention performs the feedback of the monitoring signal in real-time to properly adjust an optical transmission output and sends out only the necessary optical signal output to reduce power consumption, as well as compensates high frequency components so that cheap optical devices can be used. In addition, the AOC device according to the present invention uses the adaptive equalizer to perform the feedback of the monitoring signal from the receiver to transmitter through the electrical wire without adding an optical channel. As a result, the present invention can enhance transmission efficiency by performing the feedback of the monitoring signal through the electrical wire when compared to a method of transmitting a monitoring signal inserted in between signals transmitted. According to the present invention, a short-range AOC device can be manufactured with low cost and power consumption can be reduced. By using the AOC device according to the present invention in large installations such as data centers where many short-range AOC devices are needed, overall power consumption and maintenance costs can be reduced.

As above, the preferable embodiments have been described in the specification and the drawings. Although particular terms have been used herein, they are used only for describing the present invention and are not intended to limit the scope of the present invention as defined in claims. Therefore, those skilled in the art will understand that various modifications and equivalents may be derived from these embodiments, and the true technical protection scope of the present invention should be defined only by the technical spirit of the appended claims.

The invention claimed is:

1. An active optical cable (AOC) device for performing optical communication through an optical fiber cable connected between a transmitter and a receiver, the device comprising an electrical wire between the transmitter and the receiver for feedback of a monitoring signal from the receiver to the transmitter,
    wherein the receiver comprises:
        an optical receiver integrated circuit having an equalizing filter to compensate a high frequency component of a receiving signal and make equalization; and
        a monitoring circuit to control the high frequency component compensation in the equalizing filter, acquire a result of receiving signal size determination and the high frequency component compensation in the equalizing filter as the monitoring signal, and perform the feedback of the acquired monitoring signal to the transmitter through the electrical wire,
    wherein the transmitter comprises:
        an optical transmitter integrated circuit including a high frequency component control circuit to control a high frequency component of an input signal;
        an optical device driving circuit to drive an optical; and
        a transmitter control circuit to receive the feedback monitoring signal from the receiver through the electrical wire and control a high frequency component control code of the high frequency component control circuit and an optical signal output size control code of the optical device driving circuit based on the received monitoring signal,
    wherein the optical receiver integrated circuit comprises:
        a TIA (Trans-Impedance Amplifier) to convert a current signal undergoing photoelectric conversion through the optical device for optical reception (PD) to a voltage signal;
        an adaptive equalizer which filters the receiving signal by the equalizing filter to compensate the high frequency component of the receiving signal and continuously monitors a size and the high frequency component of the input signal to allow an optimal compensation of the high frequency component in the equalizing filter; and
        an electrical signal driving circuit to output the receiving signal with the high frequency component compensated in the adaptive equalizer in the form of an electrical signal, and
    wherein the optical receiver integrated circuit is configured to acquire a result of input signal size determination and the high frequency component compensation of the adaptive equalizer from the monitoring circuit and transmit it to the transmitter of a communication counterpart.

2. The AOC device of claim 1, wherein the AOC device is a one-directional AOC device,
    wherein the monitoring circuit is a receiver Micro-controller (MCU) configured to control the high frequency component compensation of the equalizing filter of the optical receiver integrated circuit and transmit the acquired monitoring signal to the transmitter, and
    wherein the transmitter control circuit is a transmitter MCU configured to control the high frequency component and an optical signal output size in the optical transmitter integrated circuit and receive the feedback monitoring signal, the high frequency component and the optical signal output size being controlled based on the received monitoring signal.

3. The AOC device of claim 1, wherein the AOC device is a bi-directional AOC device comprising a plurality of optical fiber cables for transmission and reception which are connected between a first connector unit and a second connector unit along with the transmitter and the receiver,
    wherein the first and second connector units comprise first and second electrical wires configured to connect respectively a transmitter and a receiver of the communication counterpart and perform the feedback of the monitoring signal from the receiver to the transmitter of the communication counterpart, and
    wherein the first and second connector units further comprise respectively a MCU for an integrated circuit,
    wherein the MCU for the integrated circuit is configured:
        to acquire the result of receiving signal size determination and the high frequency component compensation from the receiver equalizing filter as the monitoring signal;
        to perform the feedback of the acquired monitoring signal to the transmitter of the communication counterpart through the electrical wire;
        to receive the monitoring signal feedback from the receiver of the communication counterpart; and
        to control the high frequency component control code of the high frequency component control circuit and the optical signal output size control code of the optical device driving circuit based on the received monitoring signal.

4. The AOC device of claim 1, wherein the AOC device is a one-directional AOC device,
    wherein the monitoring circuit of the receiver is a circuit included within the optical receiver integrated circuit, which is an optical signal receiving and high frequency component monitoring circuit configured to acquire the result of receiving signal size determination and high frequency component compensation from the receiver equalizing filter as a monitoring signal and perform the feedback of the acquired monitoring signal to the transmitter through the electrical wire, and wherein the transmitter control circuit of the transmitter is a circuit included within the optical transmitter integrated circuit, which is an optical signal output and high frequency component control circuit configured to receive the feedback monitoring signal from the receiver through the electrical wire and control a high frequency component control code of the high frequency component control circuit and an optical signal output size control code of the optical device driving circuit based on the received monitoring signal.

5. The AOC device of claim 1, wherein the AOC device is a bi-directional AOC device comprising a plurality of optical fiber cables for transmission and reception which are connected between a first connector unit and a second connector unit along with the transmitter and the receiver, wherein the first and second connector units comprise:
first and second electrical wires configured to connect respectively a transmitter and a receiver of the communication counterpart and perform the feedback of the monitoring signal from the receiver to the transmitter of the communication counterpart;
an optical receiver integrated circuit which comprises a monitoring circuit; and
an optical transmitter integrated circuit which comprises a transmitter control circuit,
wherein the monitoring circuit within the optical receiver integrated circuit is an optical signal receiving and high frequency component monitoring circuit configured to acquire the result of receiving signal size determination and high frequency component compensation from the equalizing filter as a monitoring signal, and
wherein the transmitter control circuit within the optical transmitter integrated circuit is an optical signal output and high frequency component control circuit configured to receive a monitoring signal feedback from the receiver of the communication counterpart through the electrical wire and control a high frequency component control code of the high frequency component control circuit and an optical signal output size control code of the optical device driving circuit based on the received monitoring signal.

6. The AOC device of claim 1, wherein the optical transmitter integrated circuit comprises:
an electrical signal input circuit in which an electrical signal is input;
a high frequency component control circuit to control a high frequency component of a current signal for driving an optical device for reinforcing it; and
an optical device driving circuit to drive the optical device for optical output (VCSEL) based on the electrical signal in which the high frequency component is controlled, and
wherein the optical transmitter integrated circuit is configured to control the high frequency component control code of the high frequency component control circuit and the optical signal output size control code of the optical device driving circuit for optical output to control the high frequency component reinforcement and the optical signal output size based on the feedback monitoring signal received in the transmitter control circuit.

7. The AOC device of claim 1, wherein the adaptive equalizer comprises:

a first equalizing filter configured to output a compensated high frequency component of the receiving signal by an equalizer control code;
a second equalizing filter configured to receive the receiving signal in parallel with the first equalizing filter and output the compensated high frequency component as a monitoring signal by an equalizer monitoring code;
a size comparator configured to compare a size of the monitoring signal from the second equalizing filter with a reference voltage set by a reference voltage code; and
a digital control unit configured to convert an output sampled from the size comparator by varying the equalizer monitoring code provided to the second equalizing filter and the reference signal in the size comparator to digital data and find the optimal equalizer control code based on the digital data, thereby controlling the equalizer control code of the first equalizing filter.

8. The AOC device of claim 7, wherein the size comparator comprises:
a reference signal generator to generate an analog component reference signal which corresponds to a reference signal control code from a digital controller;
an analog comparator to acquires a difference between a monitoring signal from the second equalizing filter and a reference signal from the reference signal generator and outputs it as an analog signal; and
a sampling circuit to perform sampling and digitalizing of an output from the analog comparator every cycle of an input asynchronous clock signal.

9. The AOC device of claim 8, wherein the digital controller is configured to adjust an input signal size such that the input signal in the size comparator is within a particular reference signal range, calculate a peak value in a histogram by varying the equalizer monitoring code of the second equalizing filter or the reference signal of the size comparator after adjustment is completed, and apply the optimal equalizer control code found by the calculated peak value to the first equalizing filter.

10. A method for controlling an operation of an active optical cable (AOC) device, the method comprising monitoring a signal transmitted from a transmitter in a receiver and performing feedback of the monitoring signal,
wherein the receiver is configured to perform:
an input signal size determination step of comparing an input signal range with a reference signal range to adjust the input signal size such that the input signal is within the reference signal range;
an equalizing filter monitoring step of monitoring an equalization characteristic of a receiver equalizing filter to find an optimum high frequency band gain after the input signal is adjusted within the reference signal range;
a feedback step of collecting a result of input signal size determination from the input signal size determination step and a result of high frequency component compensation from the equalizing filter monitoring step and performing the feedback of these results to the transmitter; and
a standby step of terminating the equalizing filter for a predetermined time if the input signal is smaller than the reference signal range and then it is determined that there is no input signal in the input signal size determination step, terminating the equalizer monitoring for a predetermined time if the optimum high frequency band gain is found and applied to the equalizing filter in the equalizing filter monitoring step, and returning to the input signal size determining step by operating the equalizer monitoring and the equalizing filter after the predetermined time has elapsed, wherein the transmitter is configured to perform:

a transmitter adjustment step of controlling a high frequency component and an optical signal output size of the transmitter based on the feedback monitoring signal from the receiver, and wherein the feedback step comprises:

converting, by a TIA (Trans-Impedance Amplifier) of an optical receiver integrated circuit, a current signal undergoing photoelectric conversion through the optical device for optical reception (PD) to a voltage signal;

filtering, by an adaptive equalizer of the optical receiver integrated circuit, a receiving signal by an equalizing filter to compensate a high frequency component of the receiving signal and continuously monitor a size and a high frequency component of the input signal to allow an optimal compensation of the high frequency component in the equalizing filter;

outputting, by an electrical signal driving circuit of the optical receiver integrated circuit, the receiving signal with the high frequency component compensated in the adaptive equalizer in the form of an electrical signal;

acquiring, by the optical receiver integrated circuit, the result of input signal size determination and high frequency component compensation of the adaptive equalizer from the monitoring circuit; and transmitting, by the optical receiver integrated circuit, the result of input signal size determination and high frequency component compensation to the transmitter of a communication counterpart.

* * * * *